US010139709B2

(12) United States Patent
Halsey et al.

(10) Patent No.: US 10,139,709 B2
(45) Date of Patent: Nov. 27, 2018

(54) CORNER-ORIENTED HIGH-DEFINITION PYLON-MOUNTED CAMERAS

(71) Applicant: Admiral Video, LLC, Lancaster, NY (US)

(72) Inventors: Paul M. Halsey, Lancaster, NY (US); Joel D. Curtin, Lancaster, NY (US)

(73) Assignee: Admiral Video, LLC, Lancaster, NY (US)

( * ) Notice: Subject to any disclaimer, the term of this patent is extended or adjusted under 35 U.S.C. 154(b) by 0 days.

(21) Appl. No.: 15/784,974

(22) Filed: Oct. 16, 2017

(65) Prior Publication Data

US 2018/0039163 A1    Feb. 8, 2018

Related U.S. Application Data

(63) Continuation-in-part of application No. 15/216,989, filed on Jul. 22, 2016, now Pat. No. 9,817,299.

(Continued)

(51) Int. Cl.
*H04N 5/225* (2006.01)
*G03B 17/56* (2006.01)
(Continued)

(52) U.S. Cl.
CPC .......... *G03B 17/561* (2013.01); *A63B 71/023* (2013.01); *G02B 6/4246* (2013.01); *G02B 6/4284* (2013.01); *G02B 13/02* (2013.01); *G03B 17/02* (2013.01); *G03B 17/08* (2013.01); *G03B 17/55* (2013.01); *G03B 37/00* (2013.01); *H04N 5/2251* (2013.01); *H04N 5/2252* (2013.01); *H04N 5/2257* (2013.01); *A63B 2220/806* (2013.01); *A63B 2225/50* (2013.01); *A63B 2243/007* (2013.01); *G02B 6/293* (2013.01);
(Continued)

(58) Field of Classification Search
CPC .. H04N 5/2251; H04N 5/2252; H04N 5/2253; G03B 17/02; G03B 17/56; G03B 17/561; G03B 17/568; A63B 63/008; A63B 69/002; A63B 71/023; A63B 2071/0694; A63B 2243/007

See application file for complete search history.

(56) References Cited

U.S. PATENT DOCUMENTS 5,190,256 A    3/1993 Macchiarella
5,493,331 A    2/1996 Takahashi et al.
(Continued)

FOREIGN PATENT DOCUMENTS

EP    1911499 A2    4/2008
GB    2539837 A    12/2016
JP    20111130824 A    7/2011

*Primary Examiner* — Daniel M Pasiewicz
(74) *Attorney, Agent, or Firm* — Simpson & Simpson, PLLC

(57) ABSTRACT

A pylon/camera assembly including a body having a first face adjacent to a second face, and a third face adjacent to the first face and the second face, such that the first face and the second face form a first corner and the second and third face form a second corner, a first aperture arranged at and centered about the first corner, a second aperture arranged at and centered about the second corner, a first camera positioned within the first aperture, the first camera facing outwardly from the body, and a second camera positioned within the second aperture, the second camera facing outwardly from the body.

8 Claims, 40 Drawing Sheets

Related U.S. Application Data

(60) Provisional application No. 62/449,455, filed on Jan. 23, 2017, provisional application No. 62/195,894, filed on Jul. 23, 2015, provisional application No. 62/306,358, filed on Mar. 10, 2016.

(51) Int. Cl.

| | | |
|---|---|---|
| *G03B 17/02* | (2006.01) | |
| *G03B 17/08* | (2006.01) | |
| *G03B 37/00* | (2006.01) | |
| *G03B 17/55* | (2006.01) | |
| *G02B 13/02* | (2006.01) | |
| *G02B 6/293* | (2006.01) | |
| *A63B 71/02* | (2006.01) | |
| *G02B 6/42* | (2006.01) | |

(52) U.S. Cl.
CPC ...... *G02B 6/2938* (2013.01); *G03B 2217/002* (2013.01)

(56) References Cited

U.S. PATENT DOCUMENTS

| | | |
|---|---|---|
| 6,015,123 A * | 1/2000 | Perez .................... F16M 13/02 248/201 |
| D586,837 S | 2/2009 | McCoin |
| D680,143 S | 4/2013 | Henssler et al. |
| D689,112 S | 9/2013 | Henssler et al. |
| 8,543,525 B2 | 9/2013 | Distante et al. |
| D727,388 S | 4/2015 | Huang et al. |
| D746,350 S | 12/2015 | Li |
| 9,442,464 B2 | 9/2016 | Singleton |
| D776,740 S | 1/2017 | Okawa |
| D781,361 S | 3/2017 | Dimitriadis et al. |
| 9,823,551 B2 * | 11/2017 | Adervall ............... G03B 17/561 |
| 2003/0024171 A1 * | 2/2003 | Kao ...................... A47B 96/06 52/27 |
| 2004/0239759 A1 | 12/2004 | Wickramaratna |
| 2005/0162545 A1 | 7/2005 | Jeon |
| 2006/0273522 A1 | 12/2006 | Marshall et al. |
| 2008/0204556 A1 * | 8/2008 | de Miranda .......... B60R 25/102 348/148 |
| 2008/0232061 A1 | 9/2008 | Wang et al. |
| 2014/0063260 A1 | 3/2014 | Bender et al. |
| 2014/0212126 A1 * | 7/2014 | Inagaki ................. G03B 17/02 396/535 |
| 2014/0247324 A1 | 9/2014 | Cury et al. |
| 2014/0285669 A1 | 9/2014 | Lindner et al. |
| 2015/0195435 A1 * | 7/2015 | Oshida .................... B60R 11/04 348/373 |
| 2015/0202517 A1 | 7/2015 | Jacobson et al. |
| 2016/0279498 A1 | 9/2016 | Gordon et al. |
| 2016/0330362 A1 | 11/2016 | Singleton |
| 2016/0346690 A1 | 12/2016 | Ramachandran |
| 2017/0039671 A1 | 2/2017 | Seo et al. |
| 2017/0056721 A1 | 3/2017 | Stelfox et al. |
| 2018/0120672 A1 * | 5/2018 | Huang .................. G03B 15/03 |

\* cited by examiner

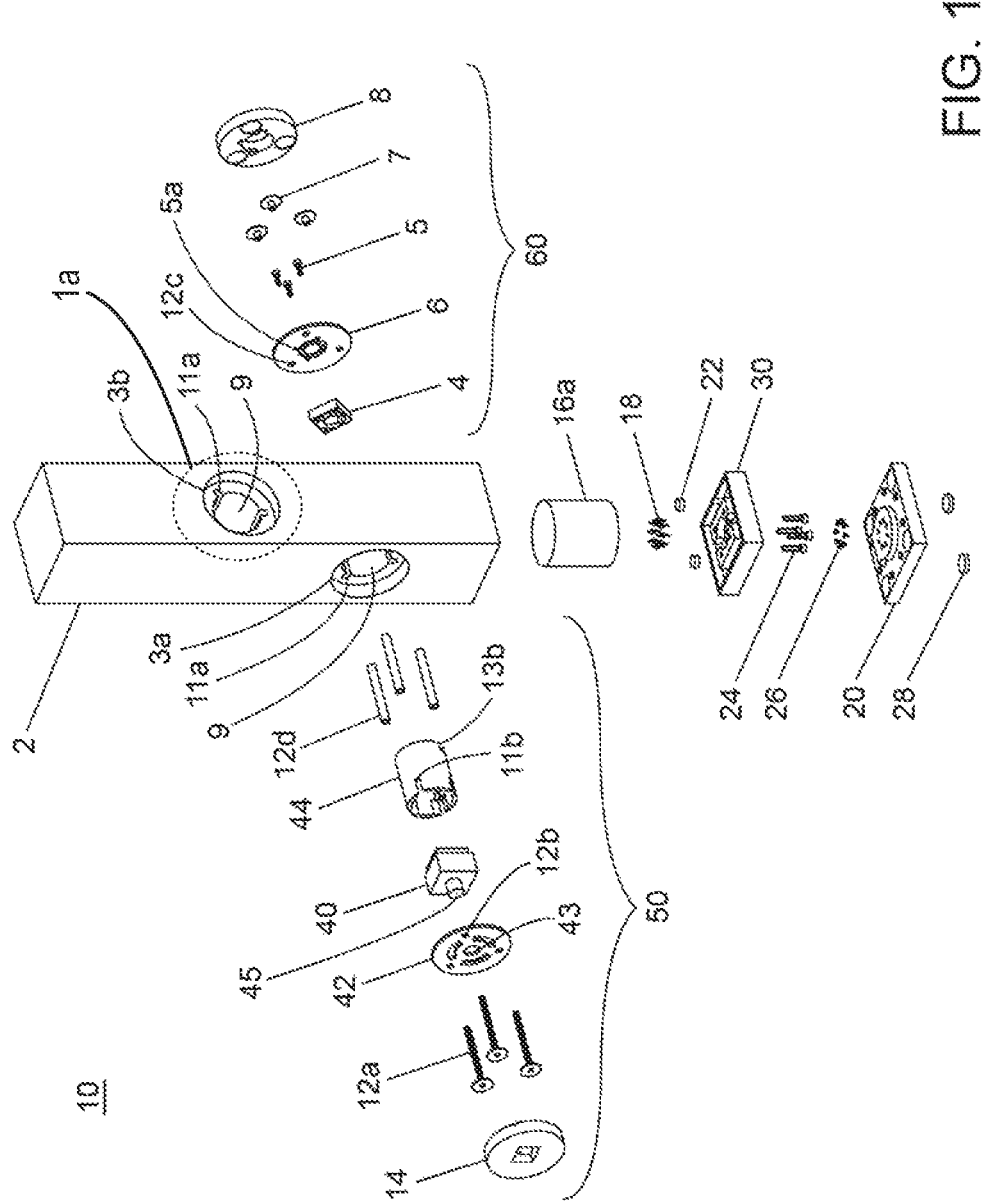

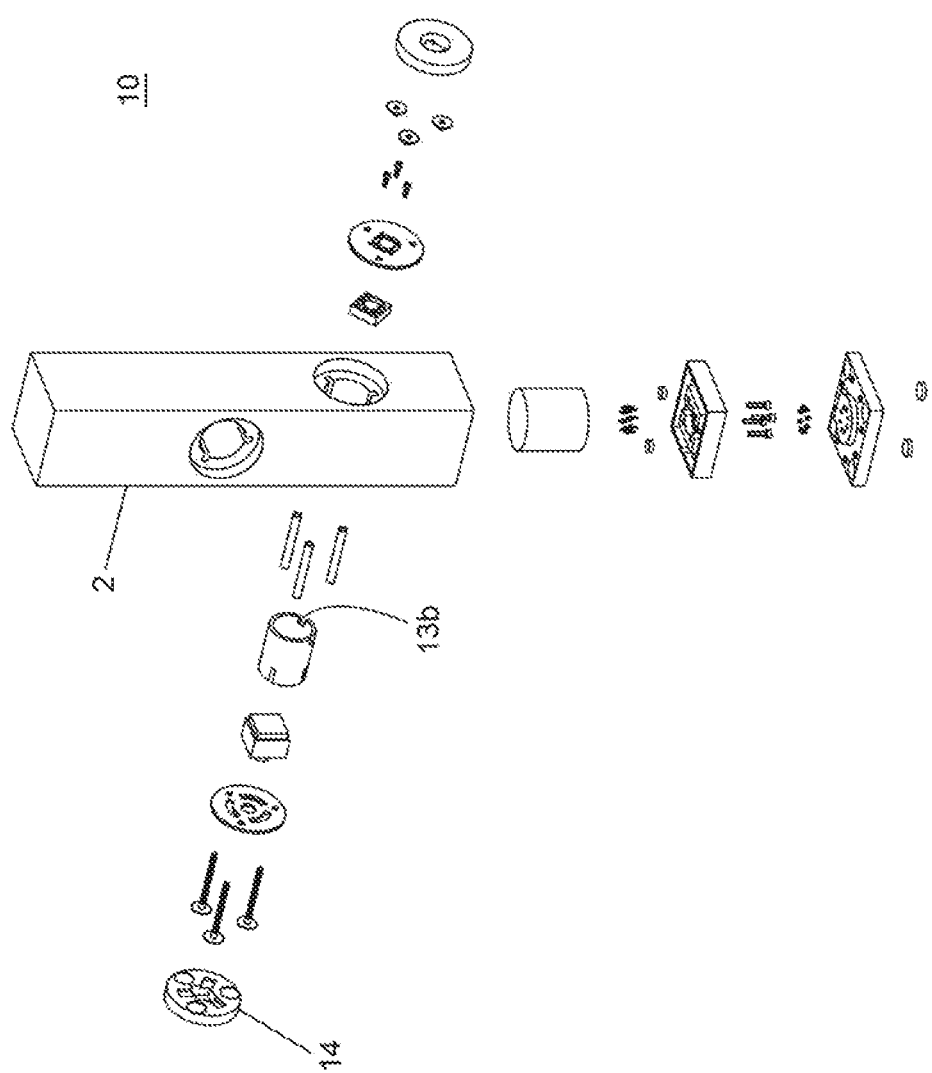

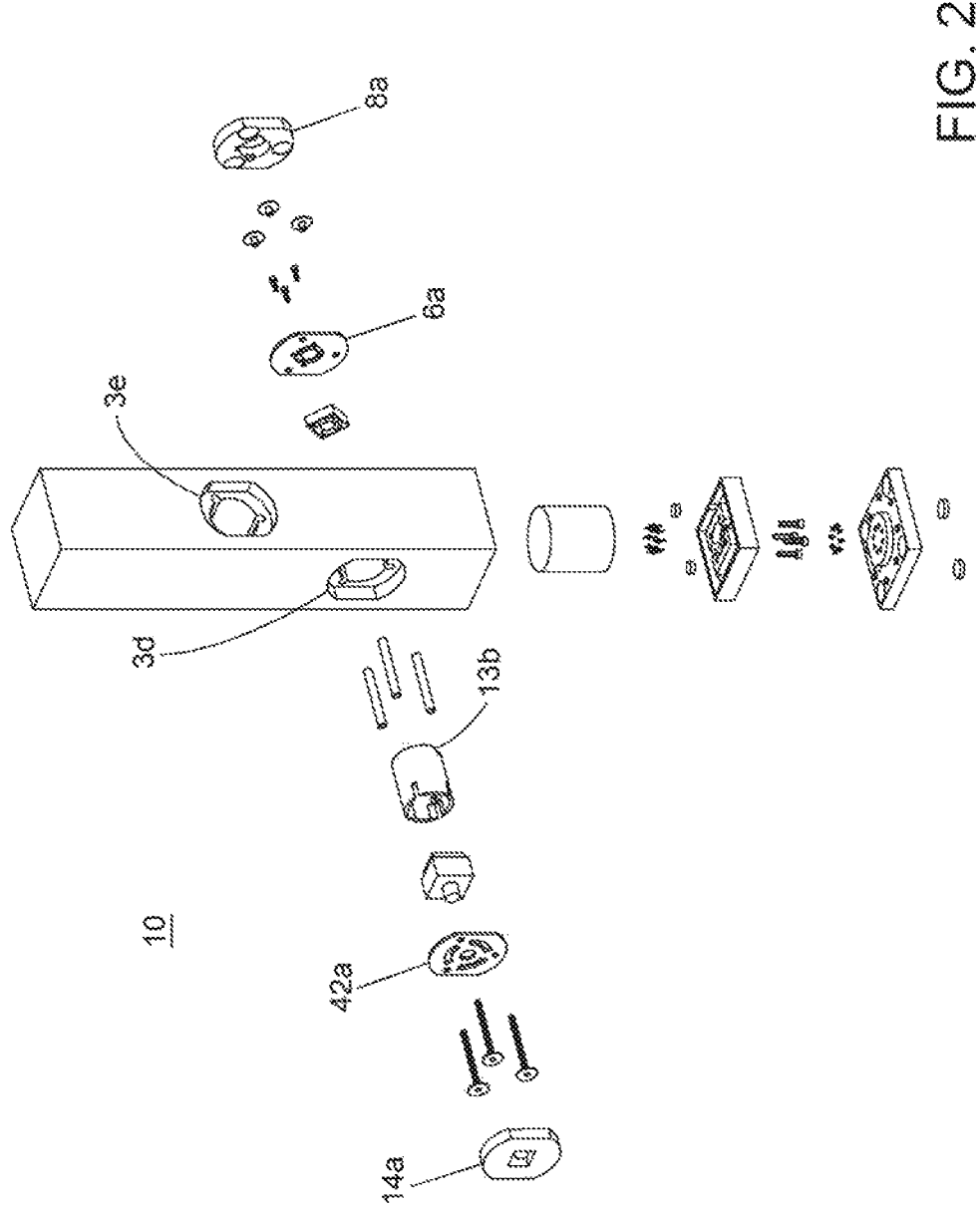

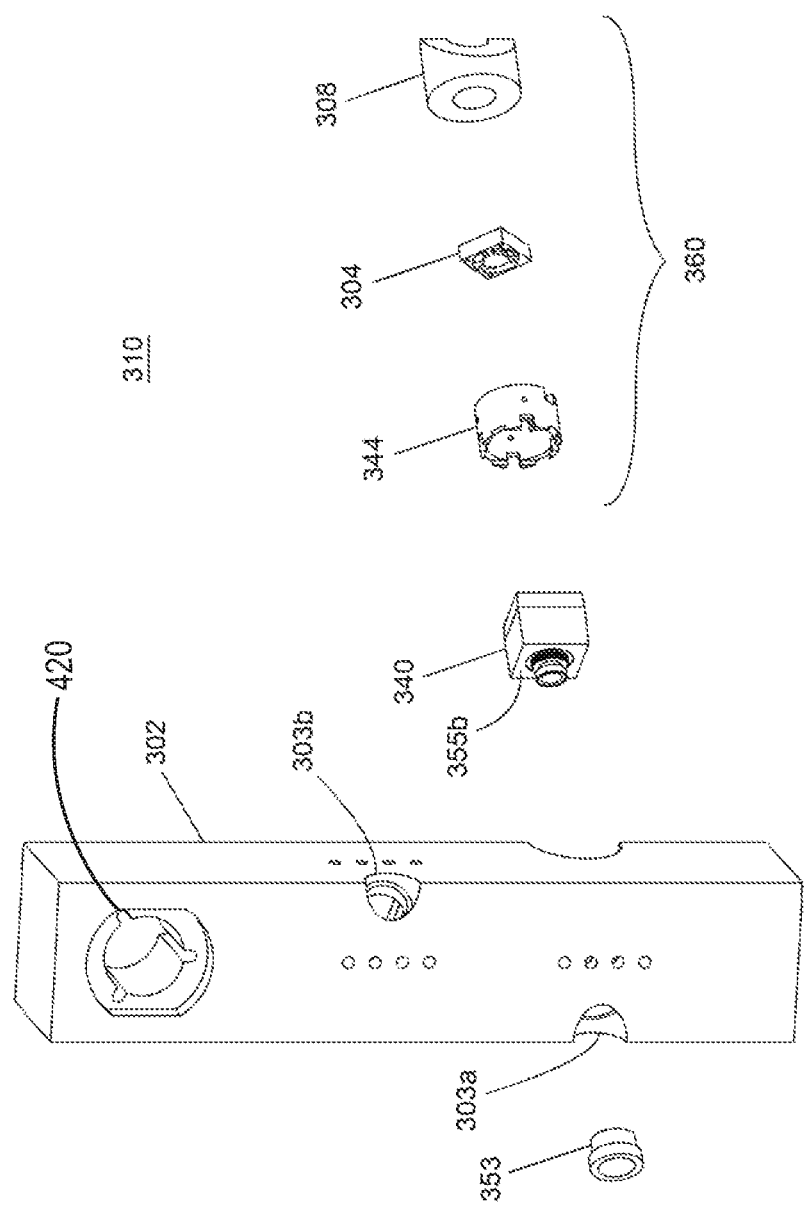

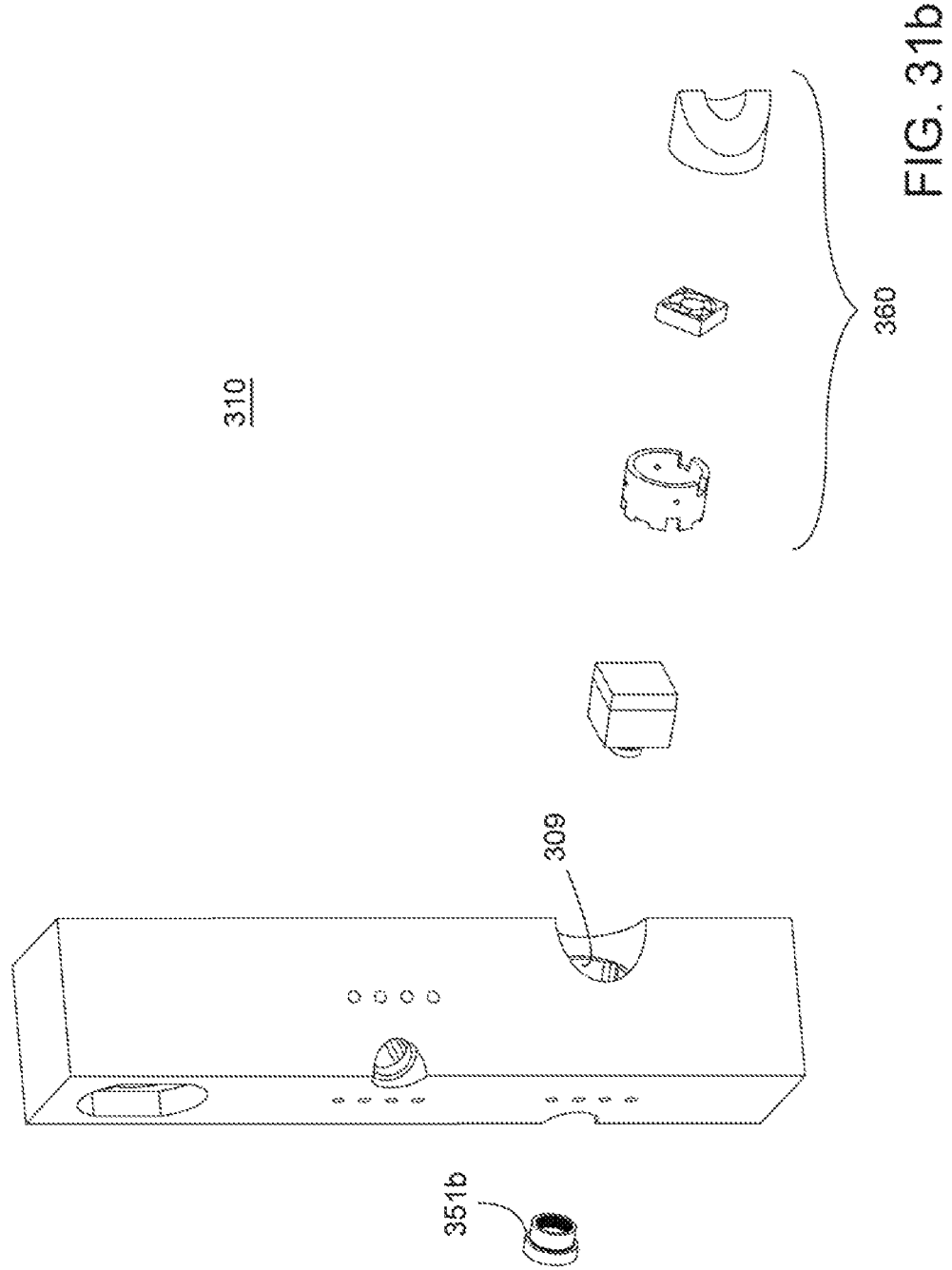

CORNER-ORIENTED HIGH-DEFINITION PYLON-MOUNTED CAMERAS

CROSS-REFERENCE TO RELATED APPLICATIONS

This application is a continuation-in-part application filed under 35 U.S.C. § 111(a) and § 120 of U.S. patent application Ser. No. 15/216,989, filed on Jul. 22, 2016, which application is a non-provisional patent application claiming priority to U.S. Provisional Patent Application No. 62/195,894 filed on Jul. 23, 2015 and U.S. Provisional Patent Application No. 62/306,358 filed on Mar. 10, 2016, which applications are herein incorporated in their entireties by reference. This application also claims priority to U.S. Provisional Patent Application No. 62/449,455 filed on Jan. 23, 2017, which application is incorporated herein in its entirety by reference.

FIELD OF THE DISCLOSURE

The present disclosure relates generally to cameras, and, more particularly, to cameras mounted within a pylon used on an American football field.

BACKGROUND

Football is a game of inches. A mere inch can be the difference between a game-winning touchdown and defeat. The NFL Rulebook states a touchdown is scored "if any part of the ball is on, above, or behind the opponent's goal line while legally in possession of an inbounds player, provided it is not a touchback." Therefore, it is of the utmost importance for game officials and the audience watching on television to have the best view possible of the goal line and sideline area proximate the goal line. Reputations, glory, and money are at stake whenever an official makes a call on the field. Over the years, the National Football League, National Collegiate Athletic Association, and other professional and amateur football leagues have attempted to eliminate as many officiating errors as possible through the use of video instant replay.

The National Football League first experimented with instant replay in 1976 when Art McNally, then the director of officiating, wanted to find out how long a video review would delay a game. However, the League viewed instant replay at that point to be too costly and inefficient, and shelved instant replay until the mid-1980s.

In 1985, the National Football League began experimenting again with instant replay, adopting a rule that allowed each team to challenge an official's ruling on two plays per game. When a play is challenged, an official reviews all available video footage of the play in question to decide whether the call on the field should stand. This effective rule change helped improve officiating throughout the National Football League. Over the years, the rules regarding instant replay have changed, leading to an increased emphasis on the strategic element of challenging on-field rulings by officials. Some of these rule changes in the National Football League include mandatory reviews of each scoring play, each turnover, and every play after the two-minute warning of each half.

Today, instant replay has become a necessity for challenged plays, and television audiences have become accustomed to being able to relive and critique every play immediately after an official blows his whistle. Officials and viewers desire the most accurate, clear, and definitive view of each play, particularly when a touchdown is scored. It is desirable to have as accurate a view of the goal line and sidelines as possible to determine if the ball has crossed the plane of the goal line, if a player with possession of the ball should be considered down, if a player carried the ball out of bounds before reaching the goal line, or if a player successfully caught a ball with both feet down in the end zone, to name a few situations.

U.S. Patent Application Publication No. 2014/0063260 (Bender et al.) discloses a video replay system constructed within a cuboid end zone pylon. Bender et al. teach a pylon comprising three high-definition cameras, one placed on the face of the pylon facing the goal line, and one on each face directed toward the sideline. This camera orientation is disadvantageous because each camera can only see down either the goal line, in the case of the camera facing the goal line, or each sideline, in the case of the cameras facing the sidelines, and it is desirable to be able to see where the goal line and sideline intersect to determine whether a touchdown has been scored. Bender et al. further teaches wireless transmission of video signals, which has been shown to be disadvantageous within an end zone pylon.

Thus, there is a long-felt need for an end zone pylon with two wide-lens corner-oriented cameras placed orthogonally in relation to one another, each capable of simultaneously visualizing the goal line and sideline, and a third camera mounted on the face of the pylon that is directly facing the goal line.

There is also a long-felt need for an end zone pylon that is wired and meets the NFL's and NCAA's safety standards.

SUMMARY

According to aspects illustrated herein, there is provided a pylon/camera assembly including a body having a first face and a second face adjacent to the first face, such that the first face and the second face form a first corner, a first aperture arranged at and centered about the first corner, and a first camera positioned within the first aperture, the first camera facing outwardly from the body.

According to aspects illustrated herein, there is provided a pylon/camera assembly including a body having a first face adjacent to a second face, and a third face adjacent to the first face and the second face, such that the first face and the second face form a first corner and the second and third face form a second corner, a first aperture arranged at and centered about the first corner, a second aperture arranged at and centered about the second corner, a first camera positioned within the first aperture, the first camera facing outwardly from the body, and a second camera positioned within the second aperture, the second camera facing outwardly from the body.

A primary object is to provide a pylon-mounted camera assembly which can be used during football games to provide an improved video replay of any scoring plays.

A further object is to provide a pylon-mounted camera assembly which complies with the National Football League's and/or the National Collegiate Athletic Association's safety rules.

Still another object is to provide a pylon-mounted camera assembly that is hard-wired and able to transmit video with a reduced latency period compared to existing wireless pylon-mounted cameras.

Yet another object is to provide a pylon-mounted camera assembly that provides high-definition video.

Another object is to provide a pylon-mounted camera assembly that is able to, with one camera, visualize a football field's sideline and goal line simultaneously with a wide-angle lens.

Another object is to provide a pylon-mounted camera assembly with cameras located at the corners of the pylon facing the field of play.

Another object is to provide a pylon/camera assembly with a first camera arranged about a first optical axis and a second camera arranged about a second optical axis, where the first optical axis and second optical axis are substantially orthogonal to one another.

Another object is to provide a pylon-mounted camera assembly with cameras located at the corners of the pylon facing the field of play where both cameras have a field of view greater than 90 degrees, and may simultaneously view both the goal line and sideline.

Yet another object is to provide a pylon-mounted camera assembly to be used on a football field wherein the side of the pylon facing the goal line comprises a camera.

These, and other objects and advantages, will be readily appreciable from the following description of preferred embodiments and from the accompanying drawings and claims.

BRIEF DESCRIPTION OF THE DRAWINGS

The nature and mode of operation of the present disclosure will now be more fully described in the following detailed description of the embodiments taken with the accompanying figures, in which:

FIG. 1 is an exploded view of a pylon-mounted camera assembly;

FIG. 1b is a reverse exploded view of the pylon-mounted camera assembly shown in FIG. 1;

FIG. 2 is an exploded view of an alternative embodiment of a pylon-mounted camera assembly;

FIG. 31 is an exploded perspective view of a corner-oriented pylon-mounted camera assembly;

FIG. 31b is a reverse exploded perspective view of a corner-oriented pylon-mounted camera assembly as shown in FIG. 31;

DETAILED DESCRIPTION

Figure 1A:
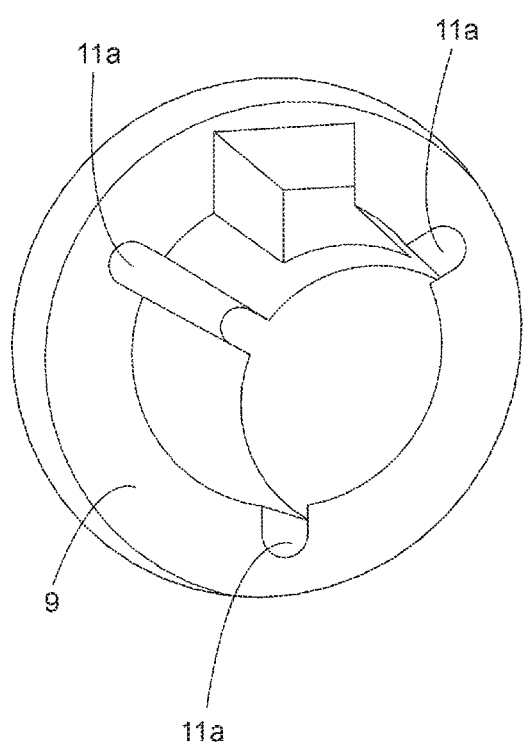
FIG. 1a is a perspective view of section 1a shown in FIG. 1, illustrating a cavity into which a camera is placed.

At the outset, it should be appreciated that like drawing numbers on different drawing views identify identical, or functionally similar, structural elements. While the embodiments are described with respect to what is presently considered to be the preferred aspects, it is to be understood that the invention as claimed is not limited to the disclosed aspect. The present invention is intended to include various modifications and equivalent arrangements within the spirit and scope of the appended claims.

Furthermore, it is understood that this disclosure is not limited to the particular methodology, materials and modifications described and, as such, may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Adverting now to the Figures, FIG. 1 is an exploded perspective view of pylon-mounted camera assembly 10. Pylon-mounted camera assembly 10 comprises pylon 2, camera sub-assembly 50, fan sub-assembly 60, cavities 3a and 3b, and connector base 20. In the preferred embodiment, pylon 2 is manufactured from molded, high-density, impact resistant foam, or any other materials that meet the standards set by football organizations, such as the National Football League and the National Collegiate Athletic Association. In the preferred embodiment, the dimensions of pylon 2 are approximately 4 inches by 4 inches by 18 inches, although it should be appreciated that these dimensions may vary. Cavities 3a and 3b are each machined into a face of the pylon to create a substantially circular aperture therethrough. Pylon 2 may contain a plurality of cavities, each accepting a camera mounting sled 15 (shown in FIG. 4). The size and position of each cavity is offset vertically from other cavities within pylon 2 to ensure that no two cavities intersect.

Camera sub-assembly 50 comprises camera-flange cover 14, T-bolts 12a, camera flange 42, camera 40, and housing 44. Notches 11b are operatively arranged to receive each of the four corners of cuboid camera 40, although it should be appreciated that camera 40 may be any shape, and that housing 44 may be adjusted accordingly to receive camera 40. Camera 40 is a high-definition camera, but may be any type of camera. The term "high-definition" as used herein is intended to mean any form of video encoding which utilizes more than 480 lines of horizontal resolution. It should be appreciated that since the term "high-definition" is defined herein as any resolution which utilizes more than 480 lines of horizontal resolution, the term "high-definition" can also refer to ultra-high definition resolutions such as 4K and 8K and include techniques such as High Dynamic Range (HDR) video and Standard Dynamic Range (SDR) video. Flange 42 is operatively arranged for a friction fit into cavity 3a, and rests upon flange seat 9. Aperture 43 of flange 42 is arranged such that camera lens 45 protrudes. T-bolt apertures 12b of flange 42 are arranged such that they may receive T-bolts 12a. Camera-flange cover 14 is placed over assembled camera sub-assembly 50 and is meant to protect camera sub-assembly 50. Camera-flange cover 14 is generally made of the same material as that of pylon 2, and contains an aperture so that camera lens 45 may protrude and visualize the area surrounding pylon 2. Sleeves 12d, while not a part of camera sub-assembly 50, may be inserted into notch 11a, and are secured into place by a friction-fit. Notches 11a are each equidistant within cavity 3a.

Fan sub-assembly 60 comprises fan 4, fan flange 6, screws 5, T-nuts 7, and fan flange cover 8. Fan 4 is secured to fan flange 6 by screws 5 through apertures 5a in fan flange 6. T-bolts 12a extend through apertures 12b in camera-flange 42 and through apertures 12c in fan flange 6 to be threaded into T-nuts 7 and torqued until they secure camera sub-assembly 50 and fan sub-assembly 60 together. Fan 4 provides cooling air to flow around the parts of the assembly that constitute sled 15. Camera sub-assembly 50 and fan sub-assembly 60 together comprise sled 15, which is secured within housing cavity 3a by camera flange 42 at one end and by fan flange 6 at the other. Friction, together with the clamping force of the camera flange 42 against pylon 2, keeps camera sub-assembly 50 and camera fan sub-assembly 60 in place. Camera flange cover 14 and fan flange cover 8 are friction-fit into the space remaining in each respective end of housing cavity 3a.

Recess 16 (shown in FIG. 14) is machined into the bottom of pylon 2, into which weight 16a is embedded. Weight 16a intended to help anchor pylon 2 in the correct upright position when in use. Wire conduits 17a and 17b (shown in FIG. 14) provide electrical wire access to cavity 3a and 3b, respectively.

FIG. 1a is a detailed perspective view of cavity 3b. Cavity 3b comprises notches 11a and circular flange seat 9. Notches 11a allow T-bolts 12a (shown in FIG. 1) to pass through pylon 2 to connect with mating T-nuts 7 (shown in FIG. 1) to secure camera sub-assembly 50 in place. Flange seat 9 is sized such that the internal diameter of cavity 3b will accept housing 44 (shown in FIG. 1), but will provide for a friction fit with camera-flange cover 14. Camera-flange cover 14 (shown in FIG. 1) rests upon flange seat 9 and serves to protect camera sub-assembly 50.

FIG. 1b is another exploded perspective view of pylon-mounted camera assembly 10. However, FIG. 1b is a reverse view of that shown in FIG. 1, and shows in further detail the way in which camera sub-assembly 50, fan sub-assembly 60, connector base 20, and pylon 2 interact.

FIG. 2 is an exploded view of an alternative embodiment of pylon-mounted camera assembly 10, wherein cavities 3d and 3e are not circular, but are instead substantially circular with flat edges. Further, camera-flange cover 14a, camera-flange 42a, fan flange 6a, and fan flange cover 8a are all substantially circular with flat edges, to match the shape of flange seat 9 of cavities 3d and 3e. However, it should be appreciated that cavities 3d and 3e, camera-flange cover 14a, camera-flange 42a, fan flange 6a, and fan flange cover 8a may be a variety of geometric shapes, including, but not limited to, triangles, squares, pentagons, hexagons, etc.

Figure 3:
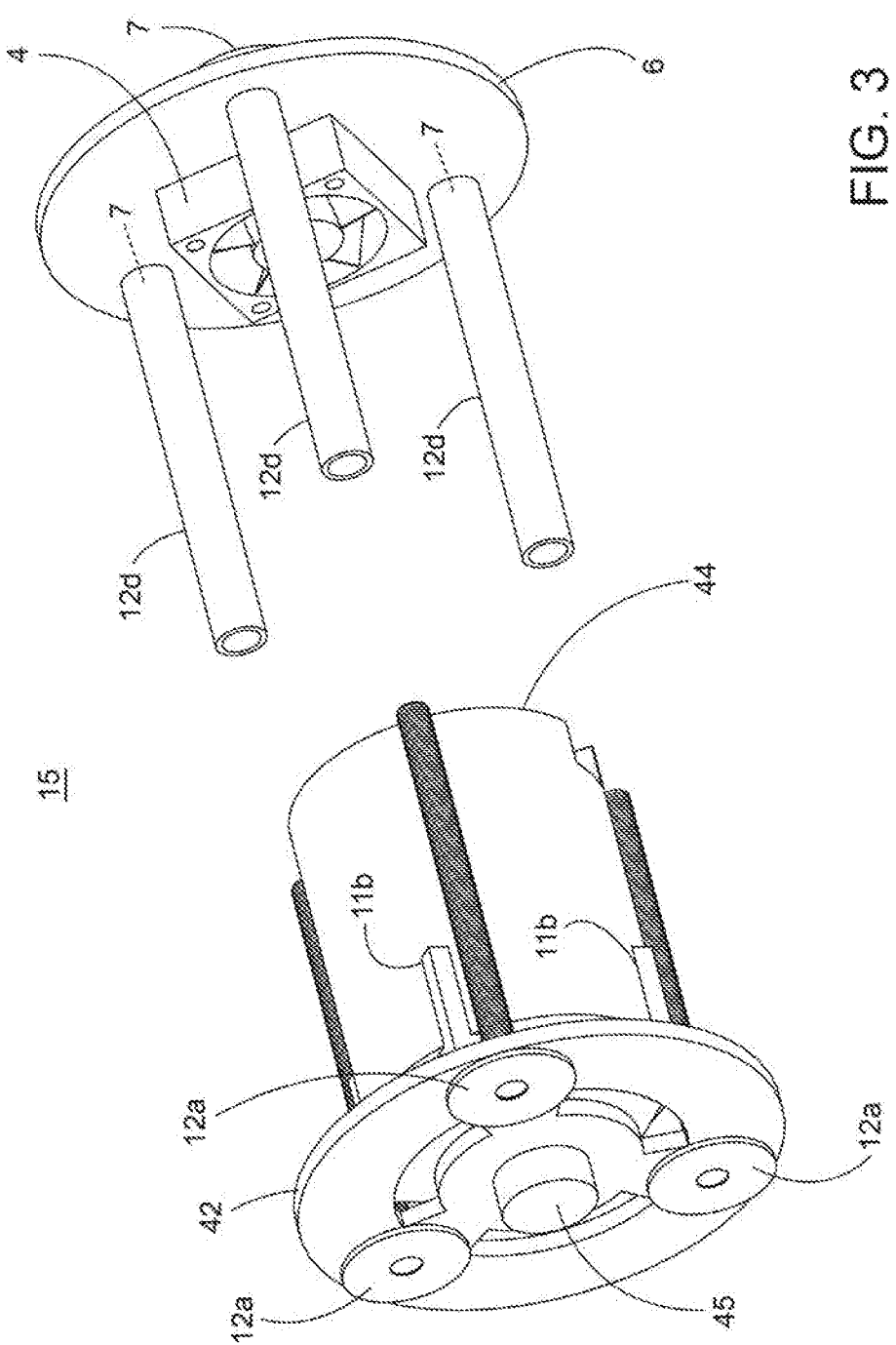
FIG. 3 is a perspective exploded view of a camera and fan structure.

FIG. 3 is a perspective exploded view of camera mounting sled 15. Camera mounting sled 15 comprises camera sub-assembly 50 and fan sub-assembly 60. When assembled, camera lens 45 protrudes through camera flange 42, and camera flange 42 friction fits into flange seat 9, while housing 44 is inserted within cavity 3a or cavity 3b. Camera-flange 44 has one or more apertures 12b through which T-bolts 12a are inserted. Notches 11b on housing 44 engage with the corners of camera 40. Fan sub-assembly 60, when assembled, comprises fan 4 in the center of fan flange 6. Fan flange 6 comprises sleeves 12d, which are through-bores optimally arranged to receive T-bolt 12a.

Figure 4:
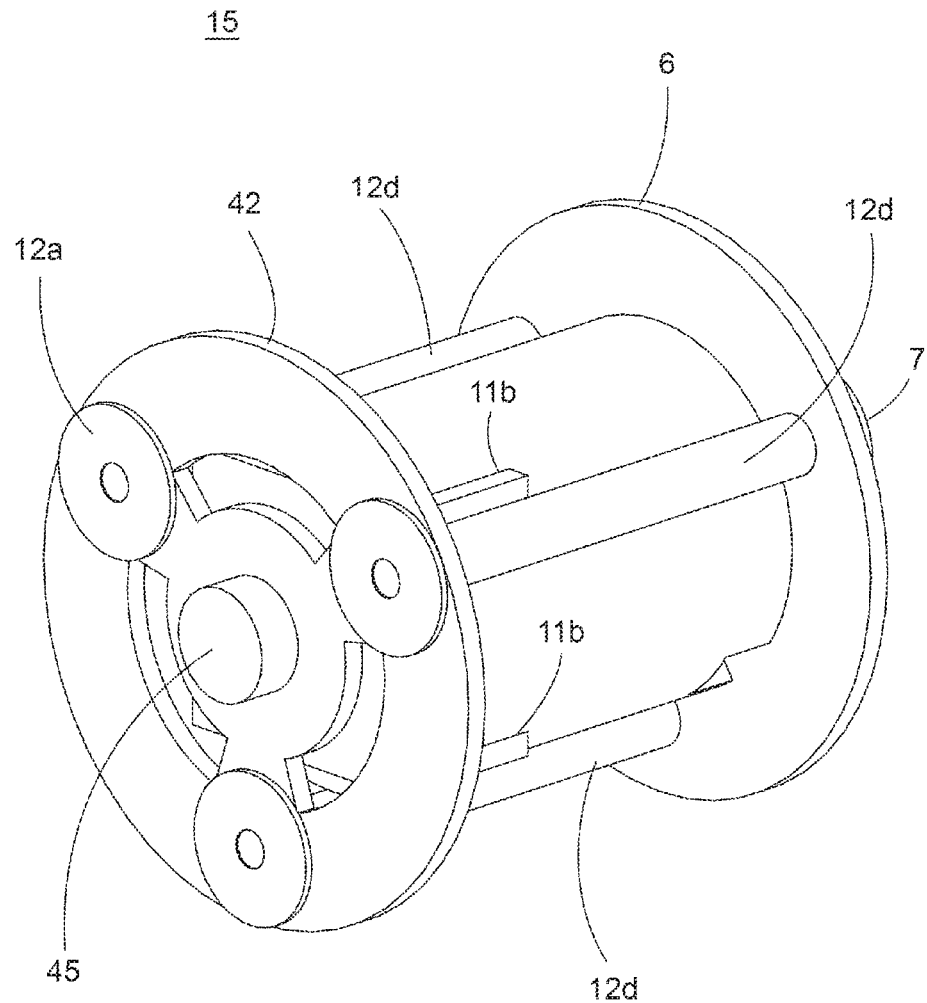
FIG. 4 is a perspective view of a camera and fan structure.

FIG. 4 is a perspective view of camera sub-assembly 50 and fan sub-assembly 60 connected to create camera mounting sled 15. T-bolts 12a are fully inserted into sleeves 12d. The distal end of T-bolts 12a protrude through sleeves 12d. T-nuts 7 are then fastened to the ends of T-bolts 12a to secure camera sub-assembly 50 to fan sub-assembly 60.

Figure 5:
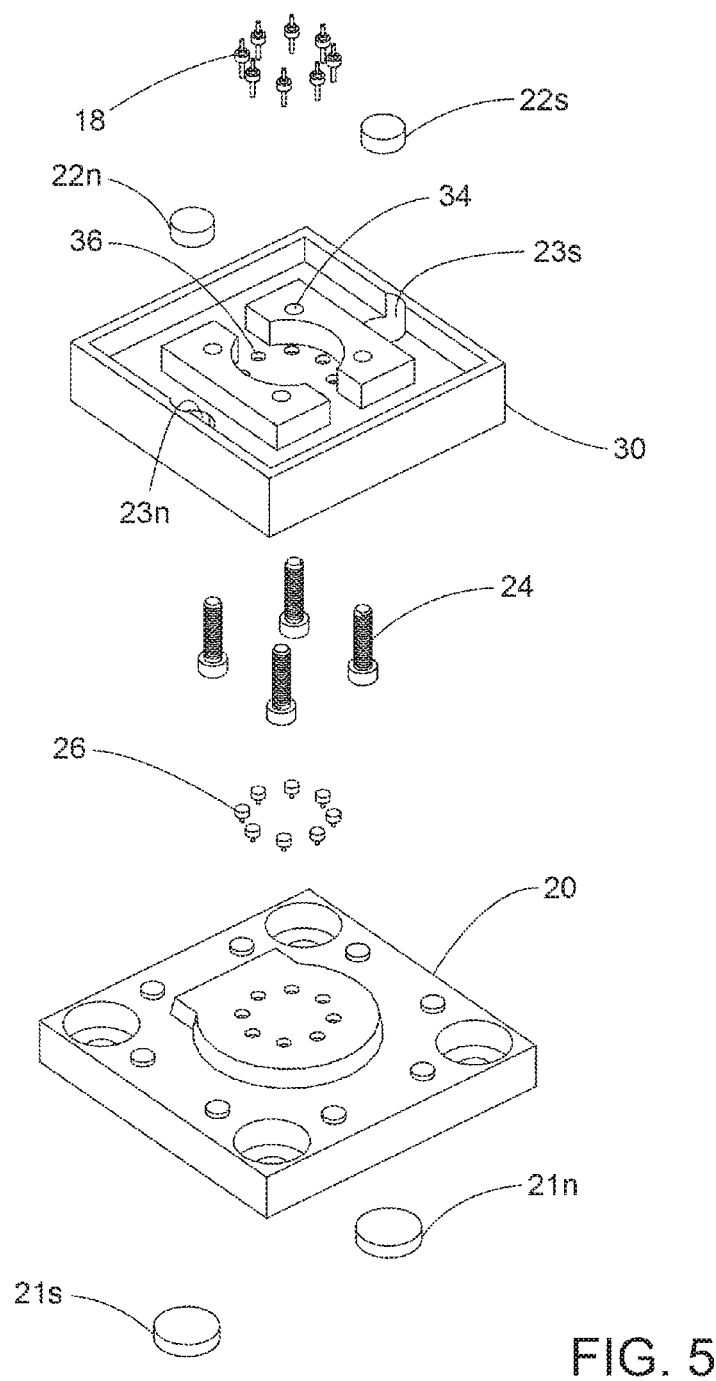
FIG. 5 is an exploded top perspective view of a base section of a pylon-mounted camera assembly.

FIG. 5 is an exploded top perspective view of connector base 20 and pylon connector 30. Pylon connector 30 is optimally arranged to engage pylon 2 (shown in FIG. 1). For pylon-mounted camera assembly 10 to transmit images from camera 40 (shown in FIG. 1) to a television production truck located some distance away from the field, the wiring of pylon-mounted camera assembly 10 must be connected to transmitter 76. This is accomplished by connecting pylon connector 30 to connector base 20. Extending from connector base 20 and continuing underneath and away from the field of play are cables 80 which carry video signals to the transmitter 76, which is located close by to the field of play.

The connection of pylon connector 30 and base connector 20 provides for nearly instant connection between pylon-mounted camera assembly 10 and transmitter 76, and thus the truck. When assembled, pylon 2 is placed onto assembled base 20, the force of magnetic attraction between magnets 22n and 22s in pylon connector 30 and magnets 21s and 21n in base connector 20, in combination with the force of gravity, bring pylon connector 30 and connector base 20 together such that pogo pins 18 contact pads 26, completing the electrical circuits necessary to carry power, data, and video signals between camera 40 (shown in FIG. 1) and transmitter 76 (shown in FIG. 9). In the preferred embodiment, pogo pins 18 and pads 26 are made of copper and are gold-plated, but it should be appreciated that they may be made of any conductive material. Pogo pins 18 are inserted through apertures 36 such that they fully protrude through apertures 36, and may contact pads 26, which are secured to base connector 20.

Pogo pins 18 establish an electrical connection with pads 26. Pogo pins 18 usually take the form of a slender cylinder containing two sharp, spring-loaded pins. Pressed between two electronic circuits, the sharp points at each end of pogo pins 18 securely contact pads 26. Pogo pins 18 are arranged in a dense array, and are used to facilitate rapid, reliable connection with pads 26. In one example embodiment, pogo pins 18 are only single-ended and not sharp, i.e., one end has the spring-loaded plunger with a rounded end and the other end is just a rounded cylinder to which wires are soldered or otherwise connected.

Figure 6:
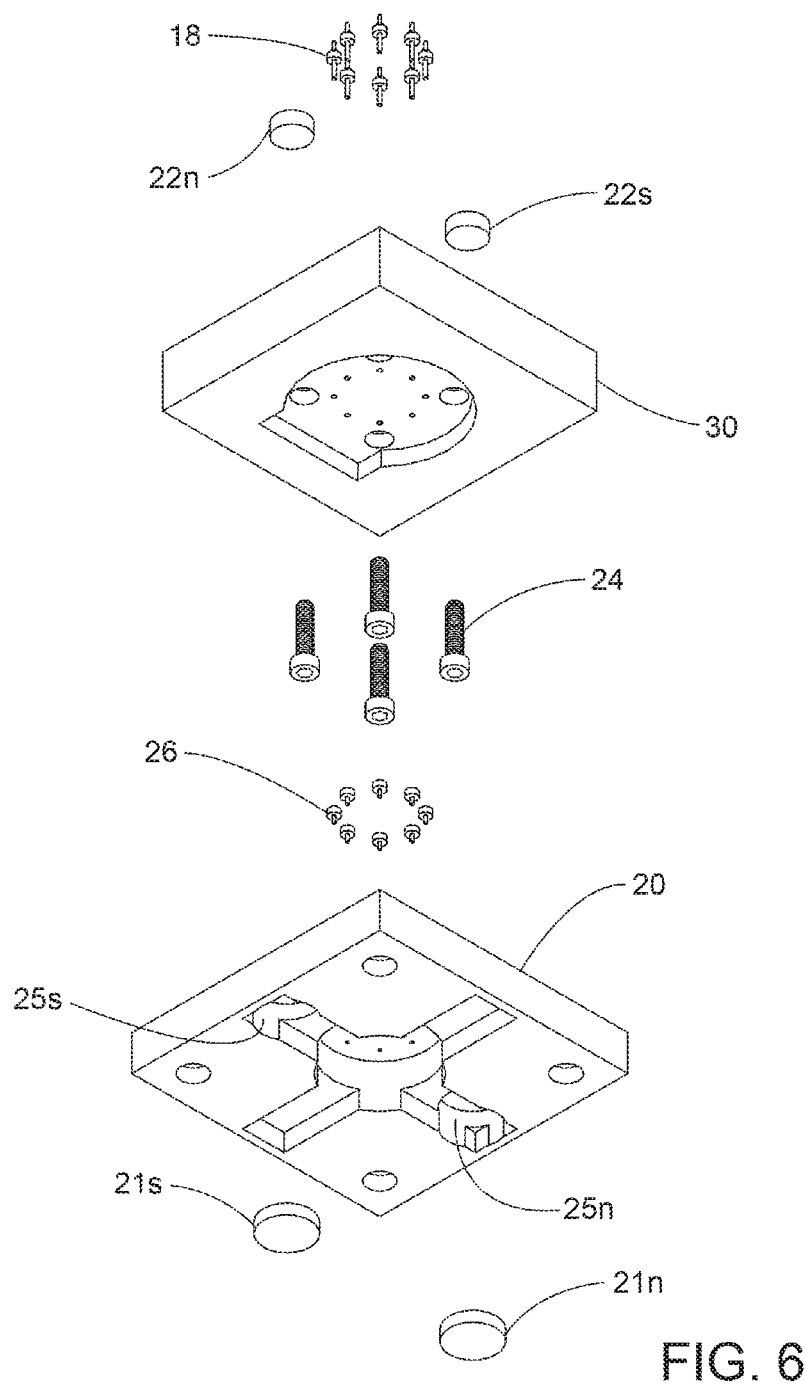
FIG. 6 is an exploded bottom perspective view of a base section of a pylon-mounted camera assembly.

FIG. 6 is an exploded bottom perspective view of connector base 20 and pylon connector 30. FIG. 6 comprises the same elements as those shown in FIG. 5 from a different perspective.

Figure 7:
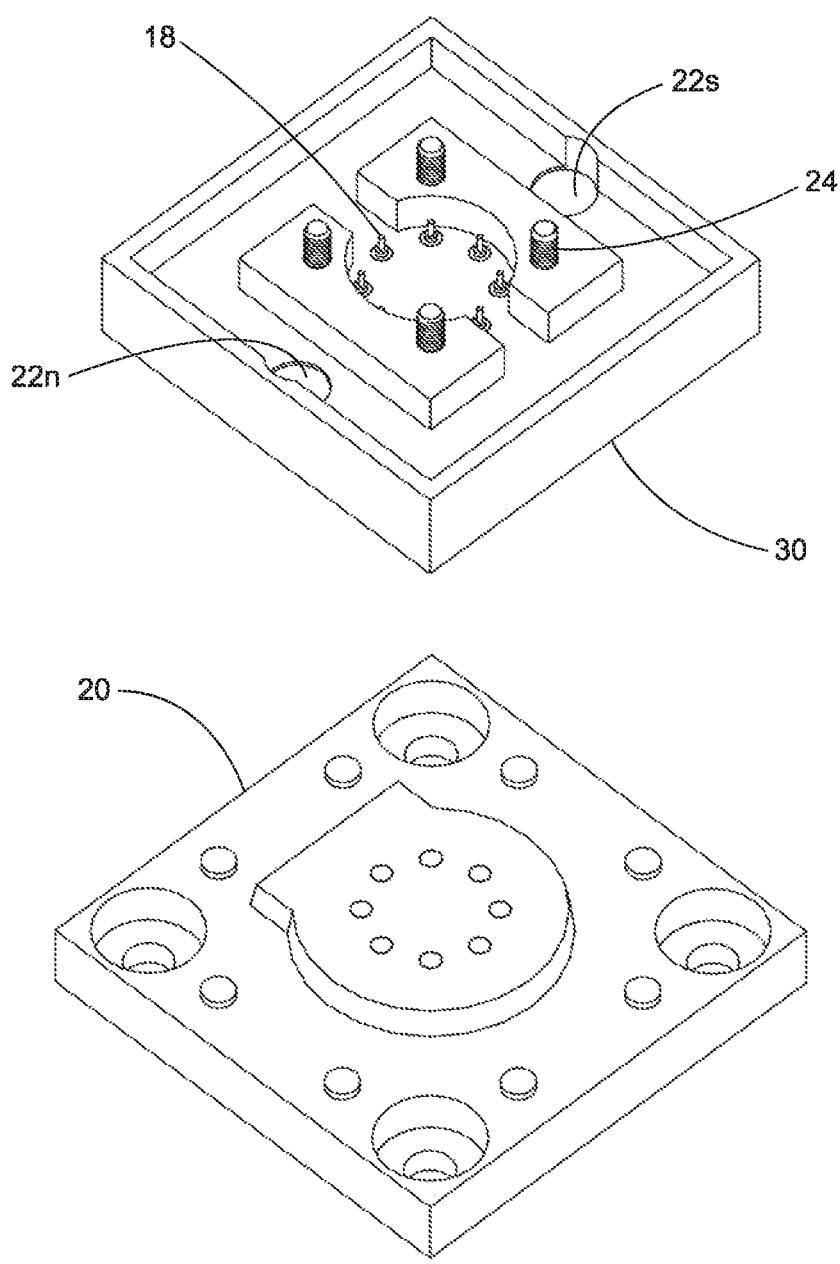
FIG. 7 is an exploded top perspective view of a base section of a pylon-mounted camera assembly.

FIG. 7 is an exploded top perspective view of assembled connector base 20 and pylon connector 30. Pylon connector 30 is fully assembled with pogo pins 18 secured through apertures 36 (shown in FIG. 5), and magnets 22n and 22s inserted within space for magnet north pole 23n and space for magnet south pole 23s, respectively. Screws 24 are also in place through apertures 34 (shown in FIG. 5) so that they may engage pylon 2 (shown in FIG. 1). Contact pads 26 have also been secured to connector base 20.

Figure 8:
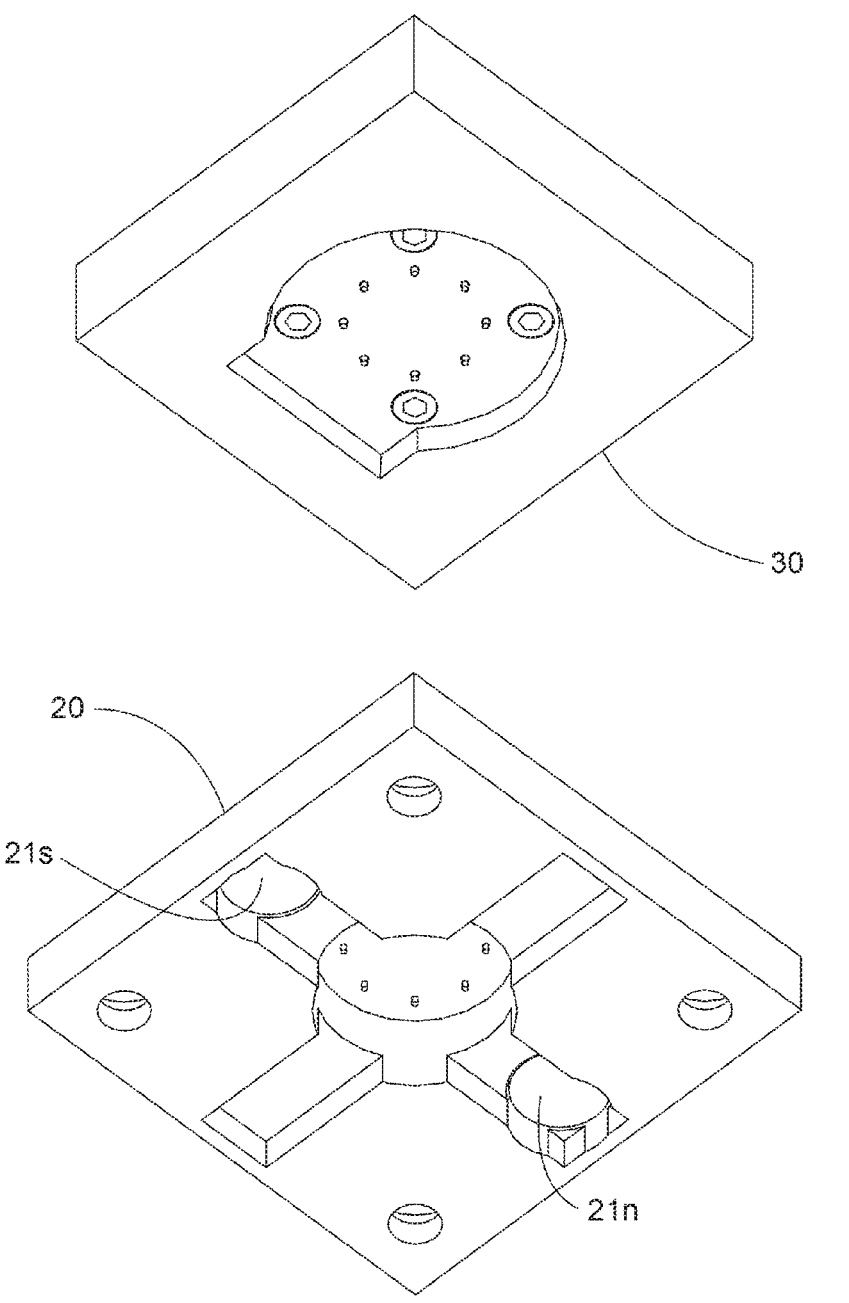
FIG. 8 is an exploded bottom perspective view of a base section of a pylon-mounted camera assembly.

FIG. 8 is an exploded bottom perspective view of connector base 20 and pylon connector 30. As in FIG. 7, all of the elements of connector base 20 and pylon connector 30 are assembled, but this vantage point shows magnet south pole 21s and magnet north pole 21n inserted within space for magnet south pole 25s and space for magnet north pole 25n, respectively.

Figure 9:
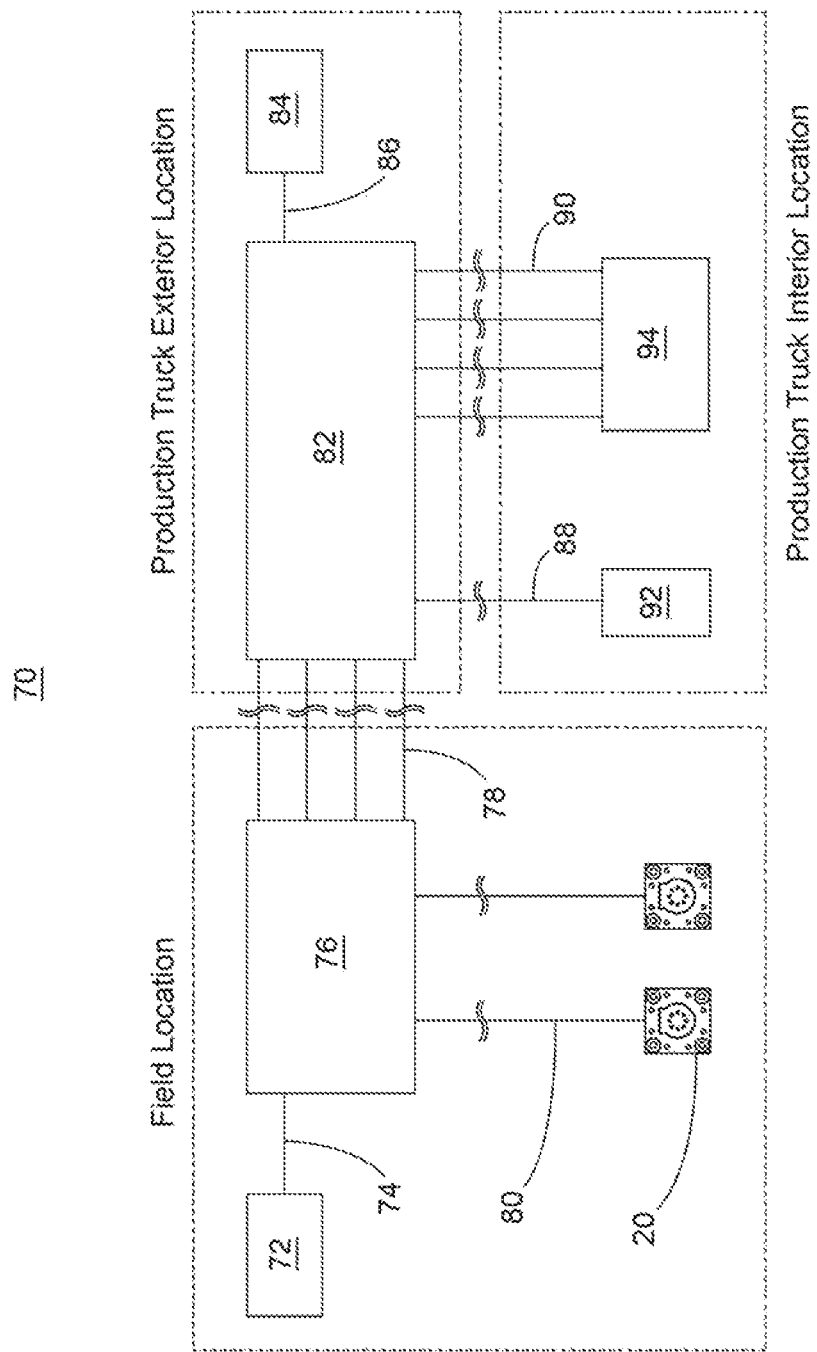
FIG. 9 is a diagrammatic exemplar electric circuit of a pylon-mounted camera assembly.

FIG. 9 shows diagrammatic circuit 70 of pylon-mounted camera assembly 10. Transmitter 76 is located nearby the playing field and connected by cables 80 to connector base 20, and housed inside transmitter 76 are data cables connected to an optical-to-electrical converter. Cables 80 carry power, data, and video signals. The video signals are connected first to re-clocking distribution amplifier 98 (not shown) and then to an electrical-to-optical converter. Power cables 74 are connected to power source 72 such as a battery or power supply, which also powers distribution amplifiers and optical converters. A typical transmitter may have more than one signal path to accommodate multiple cameras in a single pylon, and/or multiple pylons each with multiple cameras. Fiber-optic cable 78 is connected between transmitter 76 and receiver 82. The use of Wavelength-division multiplexing (WDM) technology enables bi-directional signals to share a single, single-mode optical fiber. Wavelength-division multiplexing (WDM) in fiber-optic communications is a technology which multiplexes a number of optical carrier signals onto a single optical fiber by using different wavelengths (i.e., colors) of laser light. This technique enables bidirectional communications over one strand of fiber, as well as multiplication of capacity. It should be appreciated that the video signal paths are but one example of potential transmission paths for video signals and other example paths are contemplated herein. For example, an additional signal path which carries a video signal from a truck close to the field, to a location on or near the field can be provided. This new signal path can provide a video feed from the truck which enables multiple windows of video to one location or monitor. This allows multiple cameras from one or more pylons positioned on the field to be viewable from a single display so that a technician can confirm that multiple camera signals are being received at the truck.

Additional fiber-optic cables 78 may be used for each additional signal path from the transmitter 76. Inside receiver 82, an optical-to-electrical converter connects to video cables 90 which will be connected to the production truck for additional processing, if desired, and for recording by instant replay devices or for live use in a broadcast. Controller 92 connects to receiver 82 via cable 88 to send control signals to transmitter 76, which subsequently sends those control signals to cameras 40 (shown in FIG. 1). The optical converters are powered by power source 84 such as a battery or power supply, which connects to the receiver 82 via power cable 86. Receiver 82 may have more than one signal path, the exact number of which would be determined by the number of camera signal paths 78 being sent from transmitter 76 and matched in quantity.

Transmitter 76 may transmit images recorded by camera 40 to receiver 82 via cables 78, located on the outside of the production truck. The transmitted image received by receiver 82 is then sent to video recorder 94 via cables 90. In the preferred embodiment, cables 78 are fiber-optic cables, but it should be appreciated that any cable suitable for transmission may be used.

Figure 10:
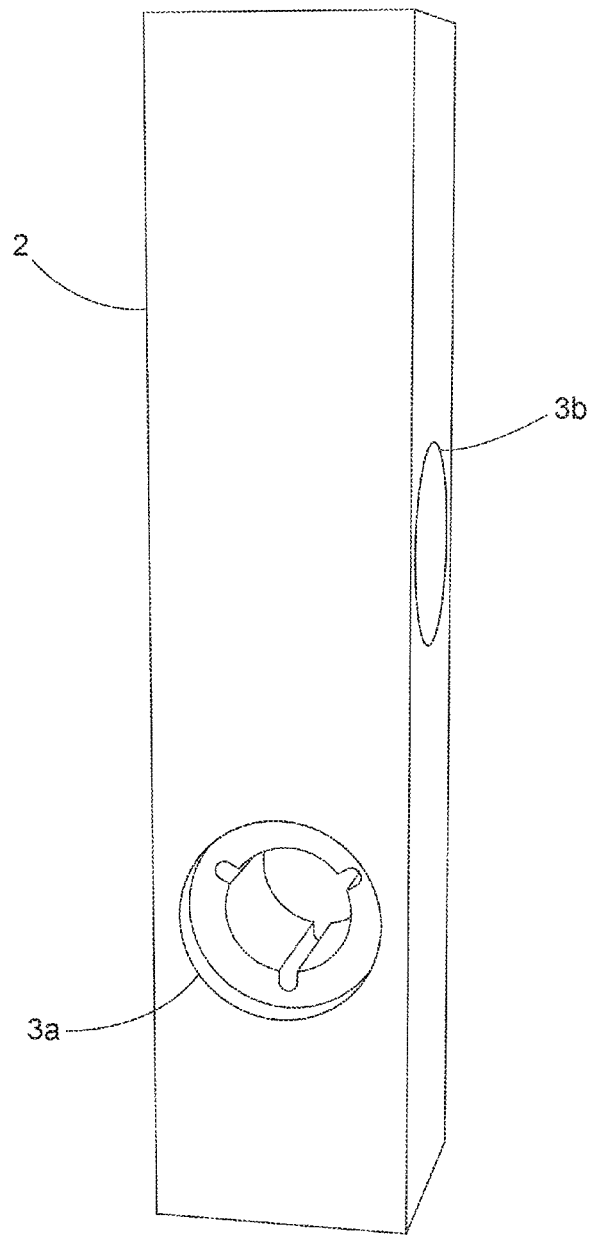
FIG. 10 is a perspective view of a two-camera pylon.

FIG. 10 is a perspective view of a two-camera embodiment of pylon-mounted camera assembly 10. Pylon 2 has cavities 3a and 3b, both of which may be machined through-bores.

Figure 11:
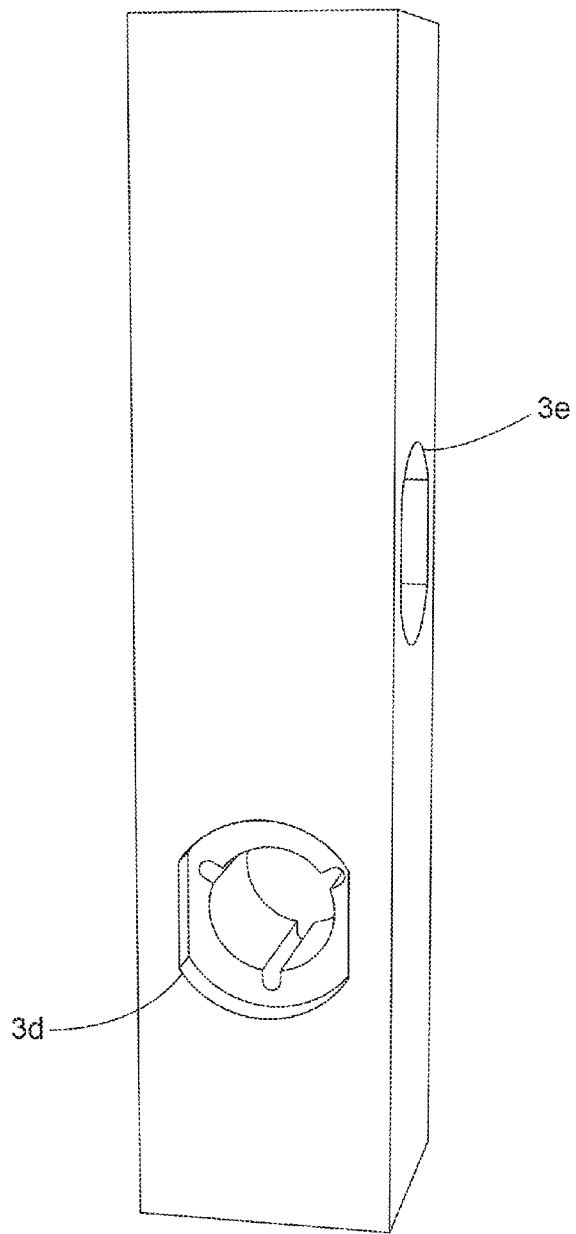
FIG. 11 is a perspective view of an alternative embodiment of a two-camera pylon.

FIG. 11 is a perspective view of another two-camera embodiment of pylon-mounted camera assembly 10, wherein cavities 3d and 3e are substantially circular with flat edges.

Figure 12:
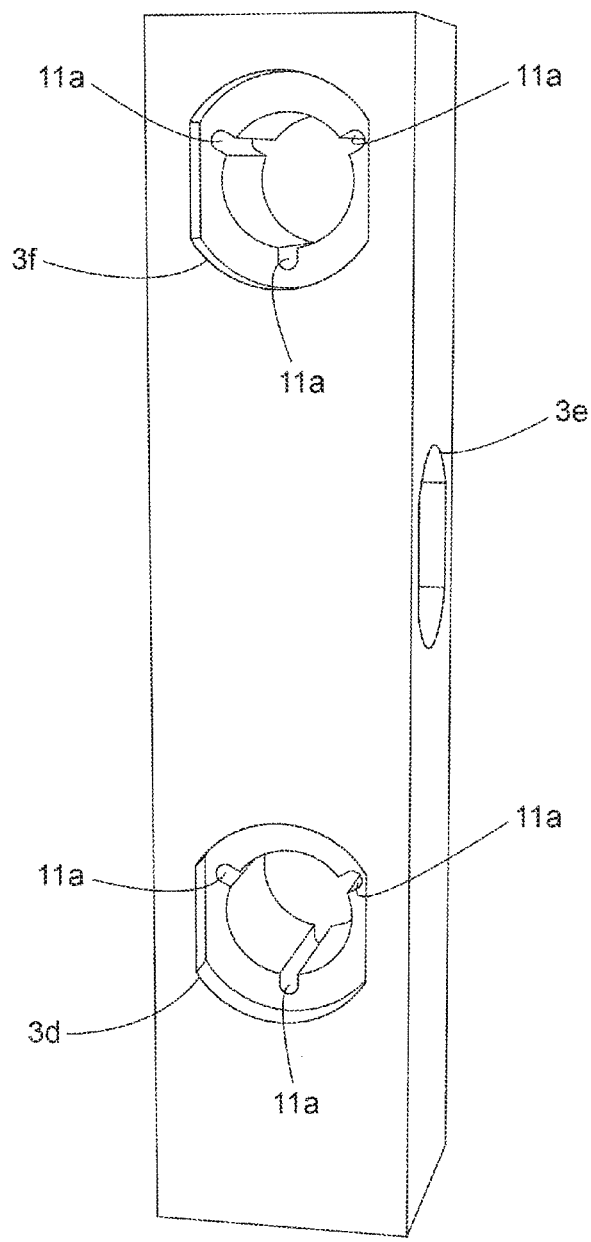
FIG. 12 is a perspective view of a three-camera pylon.

FIG. 12 is a perspective view of a three-camera embodiment of pylon-mounted camera assembly 10. In this embodiment, pylon 2 comprises cavities 3d, 3e, and 3f, all of which are substantially circular with flat edges, although it should be appreciated that cavities 3d, 3e, and 3f may be any shape. In this embodiment, cavities 3d, 3e, and 3f are substantially similar to those shown in FIG. 11. Cavity 3d is located in the bottom third of pylon 2, cavity 3e is located in the middle third of pylon 2, and cavity 3f is located in the top third of pylon 2. Cavities 3d, 3e, and 3f are symmetrical, so that camera mounting sled 15 (shown in FIGS. 3 and 4) may be inserted from either end of the cavity. In use, pylon assembly 10 is oriented in such a way that cavity 3e would face the goal line. This would enable camera 40 inserted into cavity 3e to visualize the goal line, and each camera 40 inserted in opposite directions into cavities 3d and 3f to simultaneously see the sideline on either side of pylon 2.

Figure 13:
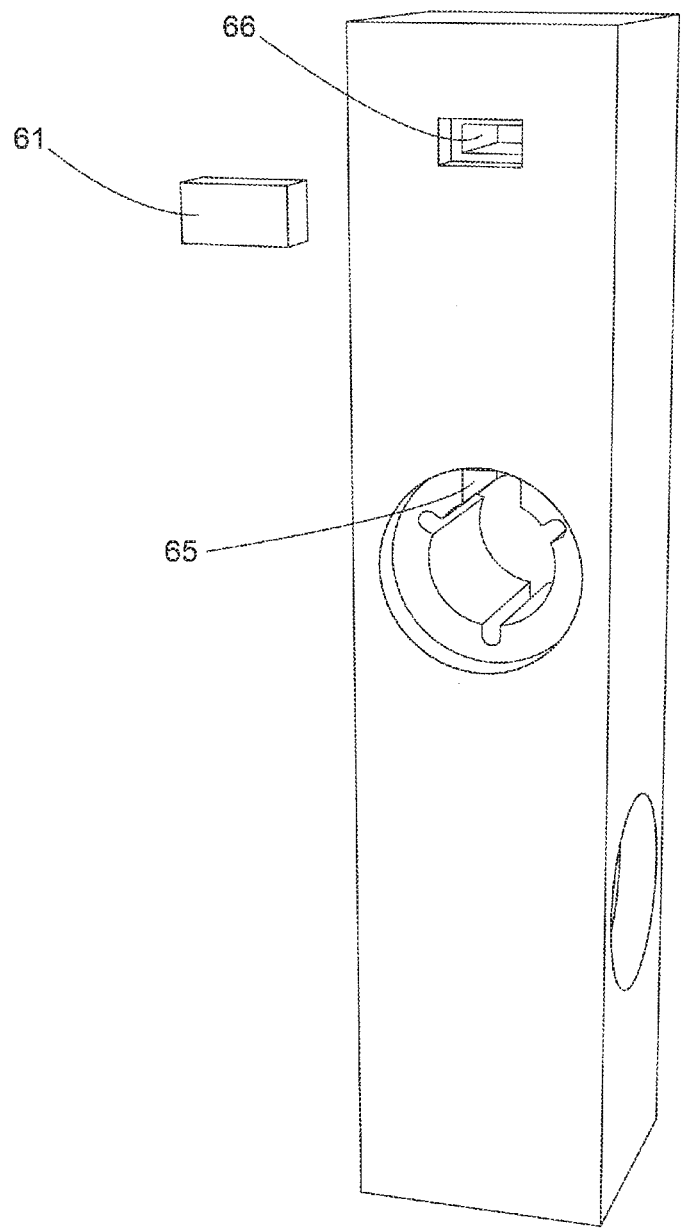
FIG. 13 is a perspective view of a two-camera pylon having spaces configured to hold an RFID chip.

FIG. 13 is a perspective view of a two-camera embodiment of pylon-mounted camera assembly 10 comprising space 65 and space 66 to hold an RFID chip. Space 66 is a discrete cavity within pylon 2, while space 65 is integrated into cavity 3b. Foam cover 61 covers chip holding space 66 after the chip has been inserted. It is to be understood that space 65 and space 66 can be configured to hold any type of chip. It should be appreciated that although space 66 is shown in a two camera embodiment of pylon-mounted camera assembly 10, space 66 may also alternatively be used in the three camera embodiment shown in FIG. 12. Space 66 may also be located on the top of pylon 2.

Figure 14:
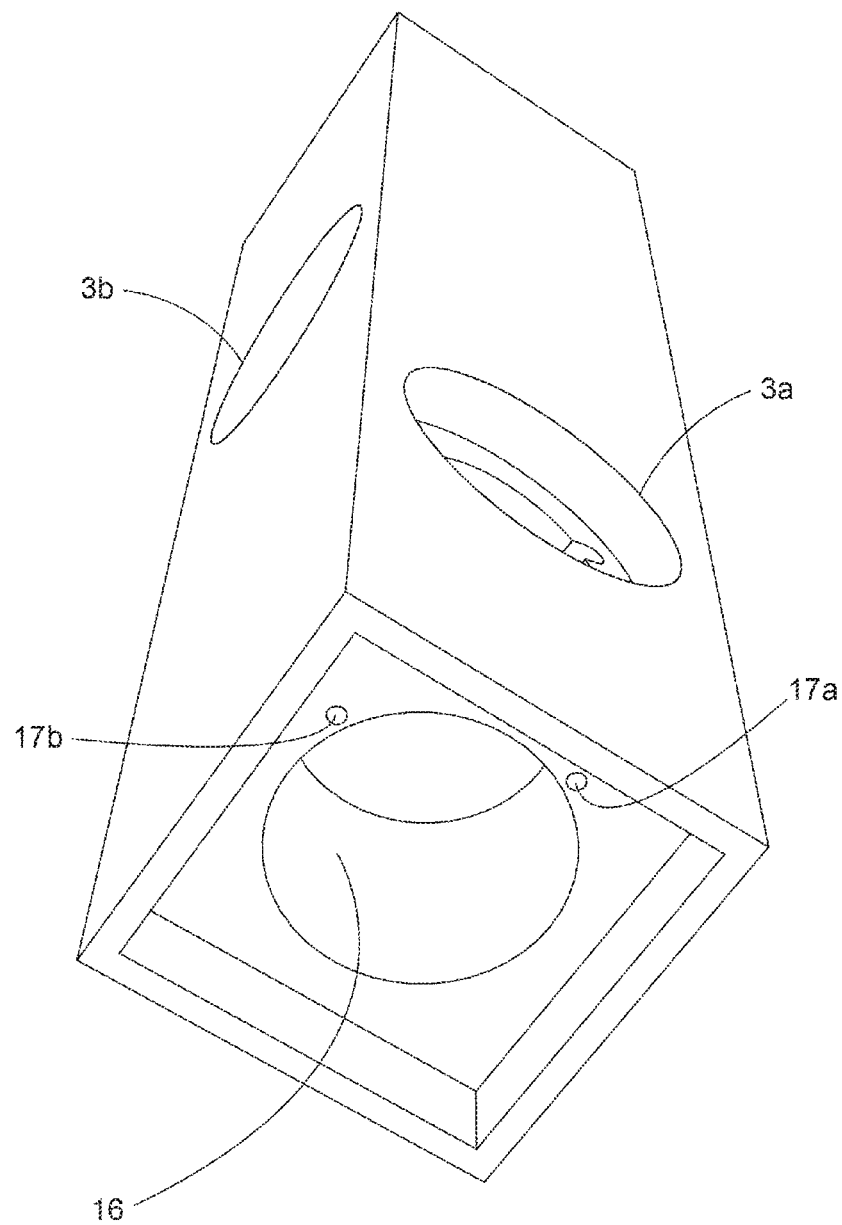
FIG. 14 is a bottom perspective view of a two-camera pylon illustrating a cavity for positioning of a stabilizing weight.

FIG. 14 is a bottom perspective view of a two-camera embodiment of pylon-mounted camera assembly 10 illustrating recess 16 which is used to hold weight 16a. Recess 16 is machined into the bottom of pylon 2, and weight 16a is embedded in pylon 2 to increase stability. The weight 16a may be clay, sand, metal, or any suitable material known in the art that satisfies the National Football League's and National Collegiate Athletic Association's safety guidelines. Wire conduits 17a and 17b are drilled into pylon 2 to provide one or more routes for electrical wiring to connect one or more cameras 40 with pogo pins 18 within pylon connector 30. For example, conduit 17a provides electrical wire access to cavity 3a and conduit 17b provides electrical wire access to cavity 3b. It is to be understood that the inventive concept and principles contemplate all methods and means of situating the borehole conduits that achieve the desired result and, also, that the inventive concept and principles contemplate any number of notches and electrical wire conduits that are required for a particular use. Further, additional conduits may be added to accommodate additional cameras 40.

Figure 15:
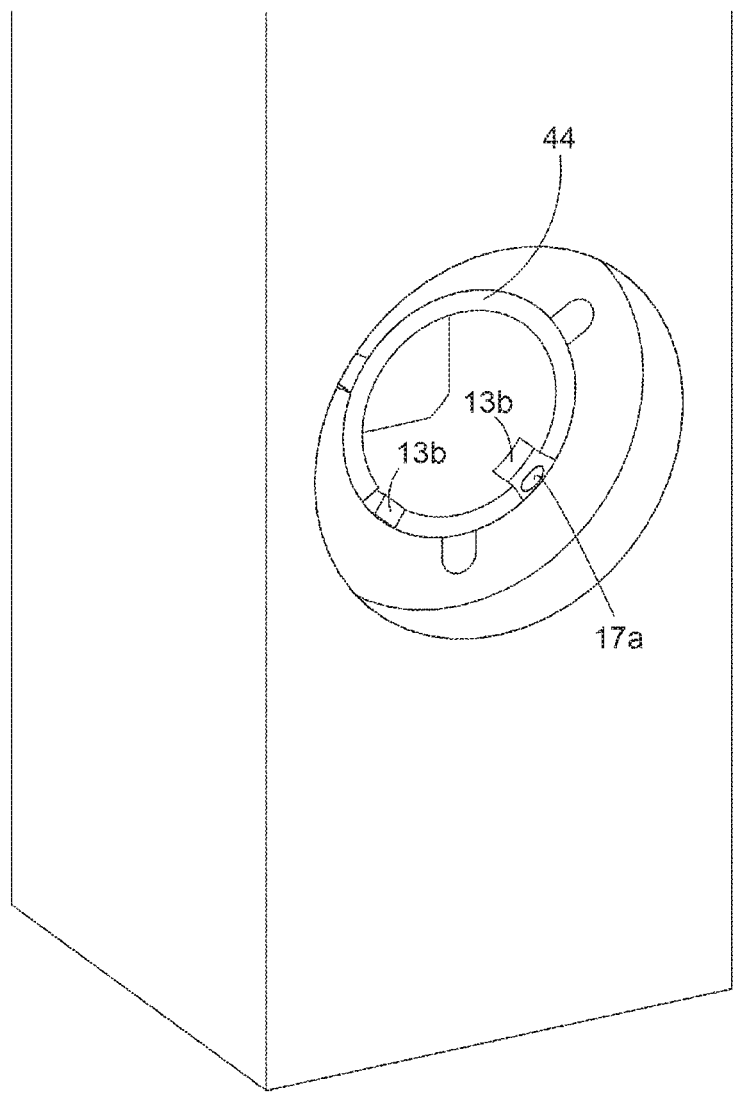
FIG. 15 is a perspective view of a two-camera pylon illustrating an electrical wire conduit.

FIG. 15 is a perspective view of the two-camera embodiment of pylon-mounted camera assembly 10 shown in FIG. 14. FIG. 15 shows the interaction of conduit 17a with notch 13b of housing 44 within cavity 3a. Conduit 17a houses electrical wires (not shown) which connect directly to camera 40 (shown in FIG. 1) mounted within housing 44, and are connected to pylon base 30.

Figure 16:
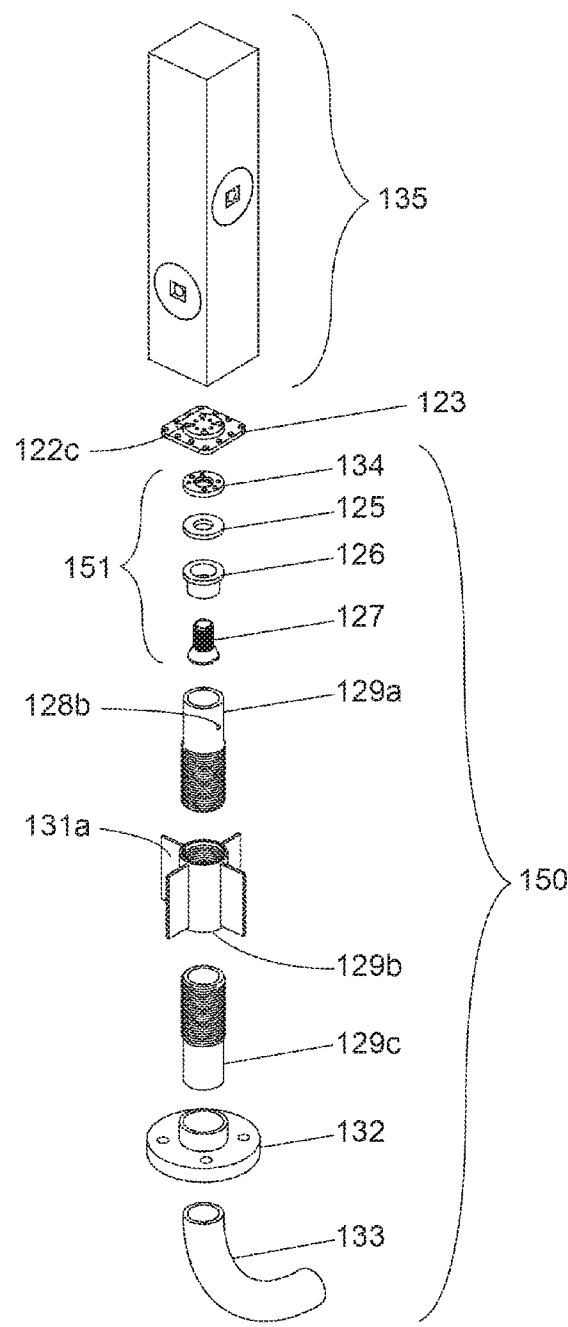
FIG. 16 is an exploded perspective view of a pylon-mounted camera assembly and a base mounting structure.

FIG. 16 is an exploded perspective view of an embodiment of pylon-mounted camera assembly 10, wherein camera sub-assembly 50 and fan sub-assembly 60 of pylon 135 are substantially similar to the embodiment described above. However, pylon 135 is connected to connector base 123. This embodiment further comprises base mounting structure 150, which includes sub-assembly 151. Conduit 133 and flange 132 are seen at the bottom of the structure. Externally threaded lower conduit section 129c is to be threaded into the bottom of the internally threaded coupler 129b. Coupler 129b has four external fins 131a arranged equidistant from each other around the circumference of coupler 129b to provide resistance to any externally applied radial force. Externally threaded upper conduit section 129a comprises anti-rotation pins 128b inserted into the unthreaded portion of the section, and is to be threaded into the top of coupler 129b. Wedging plug 127 and rubber plug 126 are to be inserted into the top of conduit 129a. Foam rubber washer 125 sits on top of rubber plug 126. Locking nut 134 is screwed onto wedging plug 127. Connector base 123 is substantially similar to connector base 20 described earlier, except connector base 123 is fastened to locking nut 134 with cap head screws through apertures 122c. Pylon 135 sits atop connector base 123, providing for electrical connection.

Figure 17:
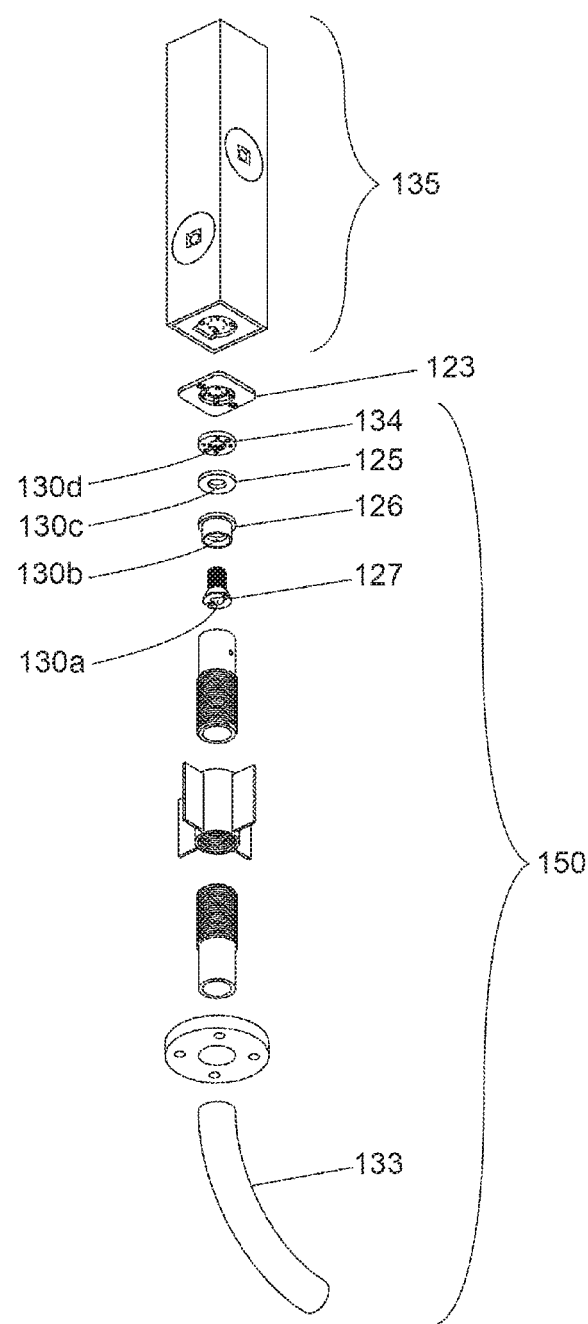
FIG. 17 is an exploded bottom perspective view of a pylon-mounted camera assembly and a base mounting structure.

FIG. 17 is an exploded bottom perspective view of pylon-mounted camera assembly 135, connector base 123, and base mounting structure 150. In this view of pylon-mounted camera assembly 135, apertures 130a-130d can clearly be seen, which allow wires in base mounting structure 150 to pass-through sub-assembly 151 to connect to connector base 123.

Figure 18:
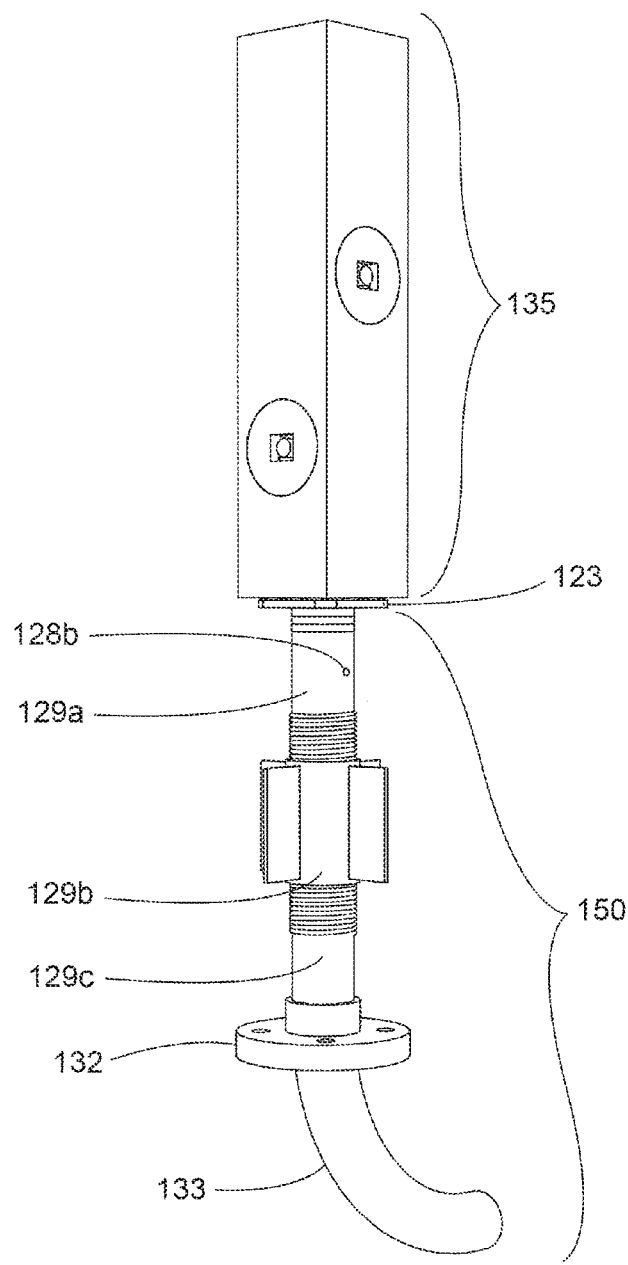
FIG. 18 is a perspective view of a pylon-mounted camera assembly and base mounting structure.

FIG. 18 is a perspective view of pylon 135, connector base 123, and base mounting structure 150 fully assembled. In this embodiment, connector base 123 is flush with the surface of the playing field, and base mounting structure 150 is completely below the field of play.

Figure 19:
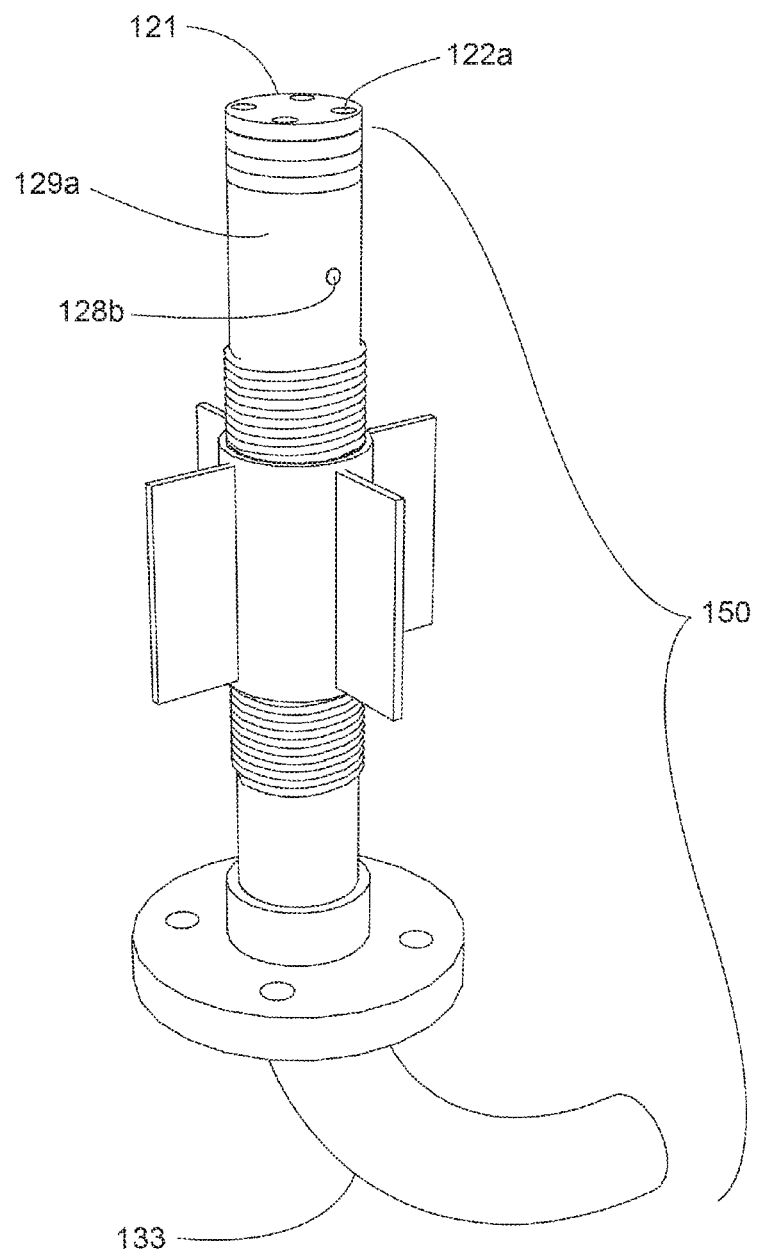
FIG. 19 is a perspective view of an assembled base mounting structure.

FIG. 19 is a perspective view of assembled base mounting structure 150 with cap 121 installed. Cap 121 is installed atop base mounting structure 150. The cap has flathead screw apertures 122a, through which flathead screws engage sub-assembly 151 (see FIG. 16) of base 150. Cap 121 is installed in place of connector base 123 when the pylon camera assemblies are not in use, preventing unnecessary wear on the base mounting structure's interior, e.g. water damage.

Figure 20:
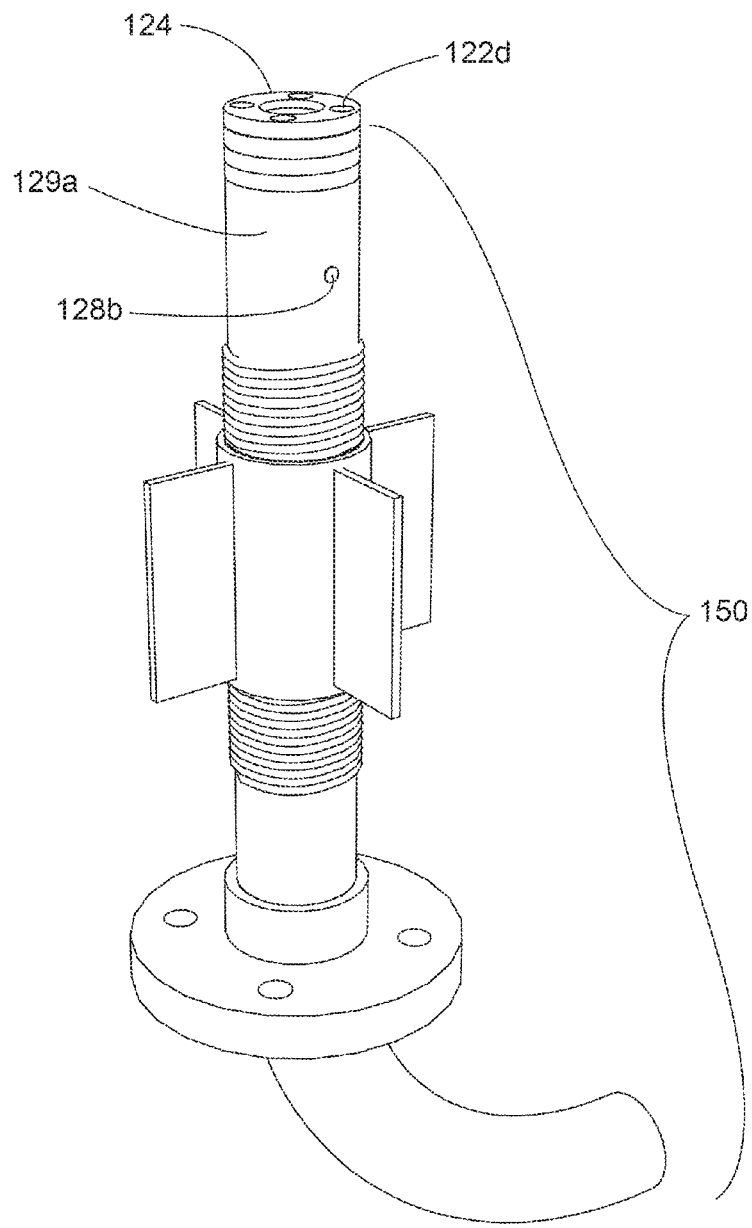
FIG. 20 is a perspective view of an alternative embodiment of an assembled base mounting structure.

FIG. 20 is a perspective view of an alternative embodiment of assembled base mounting structure 150 wherein pass-through cap 124 is installed atop base mounting structure 150. The pass-through cap has flathead screw apertures 122d, through which flathead screws engage sub-assembly 151 (shown in FIG. 16) of base 150. Pass-through cap 124 is installed in place of connector base 123 when use of a pylon, or other device, that does not have a pylon connector is desired, but where exposure to elements is not a factor, e.g., when the pylon is installed indoors. Self-sealing cap 210 (shown in FIG. 29) serves a similar purpose to pass-through cap 124 of allowing a pylon or other device without a pylon connector to be connected to wires within the base mounting structure 150, but provides the additional benefit of sealing the interior of the base mounting structure from the elements.

Figure 21:
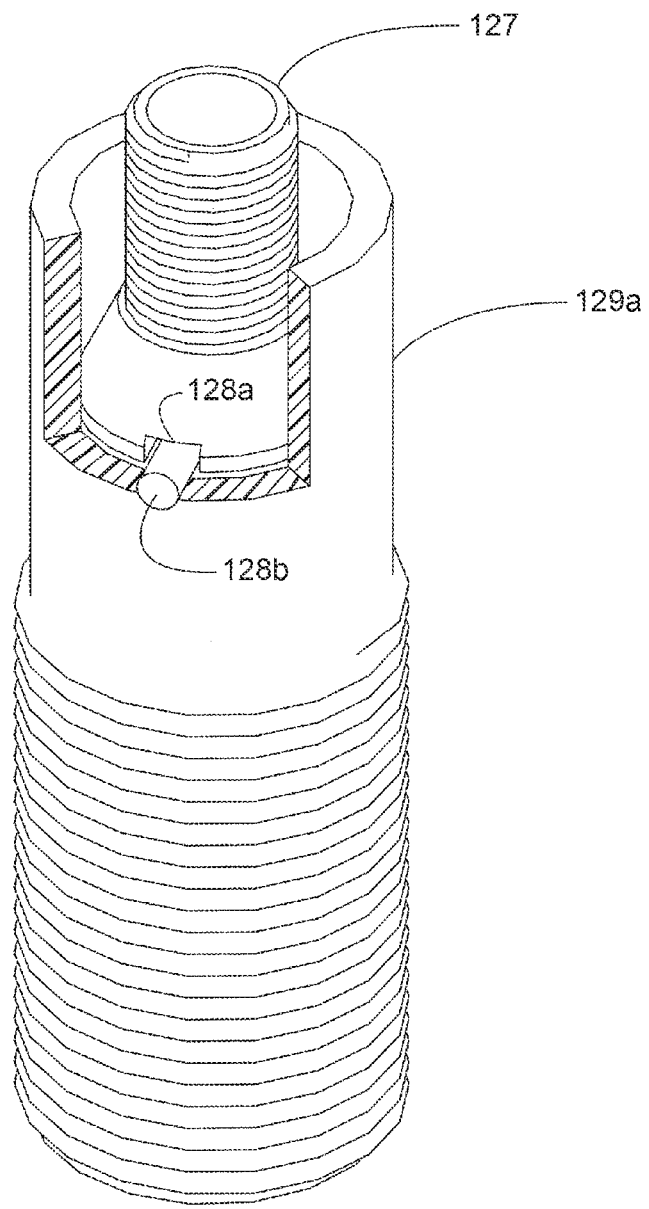
FIG. 21 is a fragmentary perspective view of the engaging portion of the assembled base mounting structure shown in FIG. 20.

FIG. 21 is a fragmentary perspective view of the engaging portion of assembled base mounting structure 150 and sub-assembly 151 shown in FIG. 16. Externally threaded upper conduit section 129a has wedging plug 127 inserted. Pin 128b engages with notch 128a to prevent the rotation of plug 127, and acts as a depth stop when wedging plug 127 is inserted, preventing plug 127 from being inserted too far into upper conduit section 129a.

Figure 22:
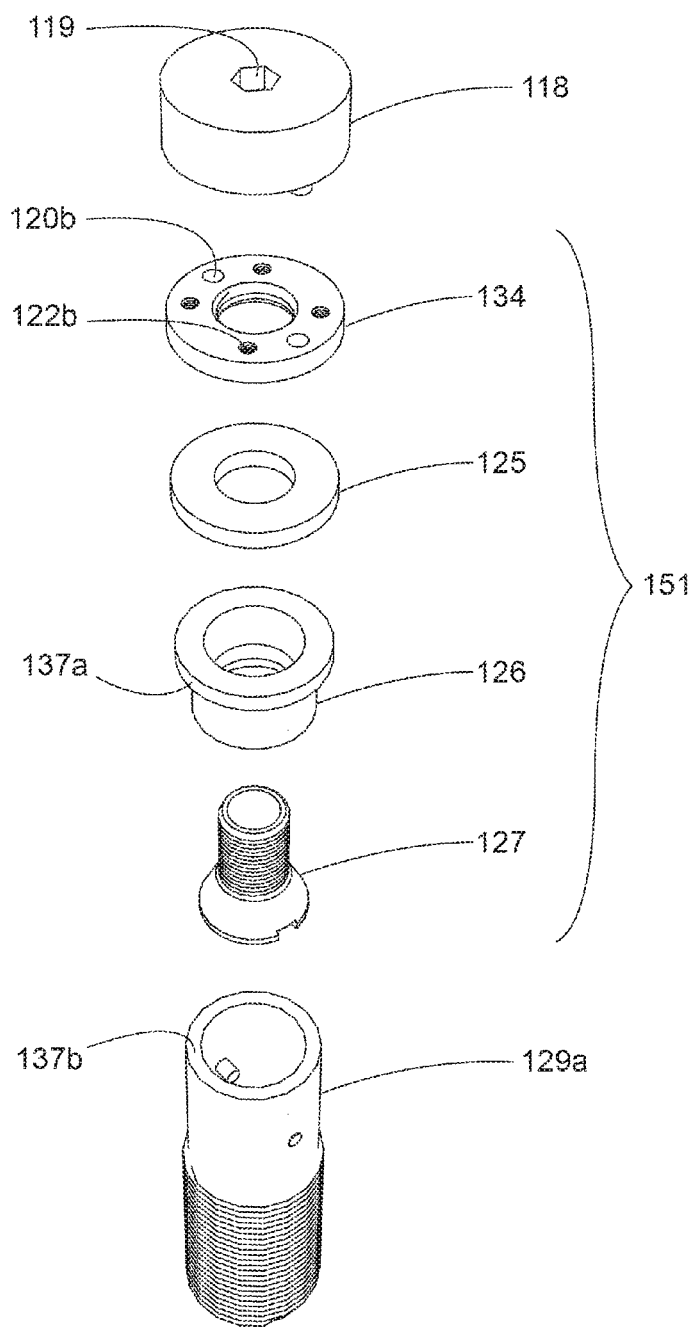
FIG. 22 is an exploded top perspective of a plug sub assembly.

FIG. 22 is an exploded top perspective view of plug sub-assembly 151. Cylinder 118 comprises a hexagonal cavity 119, into which a hex key may be inserted to provide torque. Cylinder 118 sits on locking nut 134, which comprises screw apertures 122b and pin aperture 120b. Locking nut 134 sits on foam rubber washer 125, which sits on the top surface of flange 137a of rubber plug 126. This provides impact force absorption. Rubber plug 126 sits on conduit top surface 137b of upper conduit section 129a. It should be appreciated that cylinder 118 is used as an installation tool and is removed to allow installation of 121, 123, or 124 discussed supra.

Figure 23:
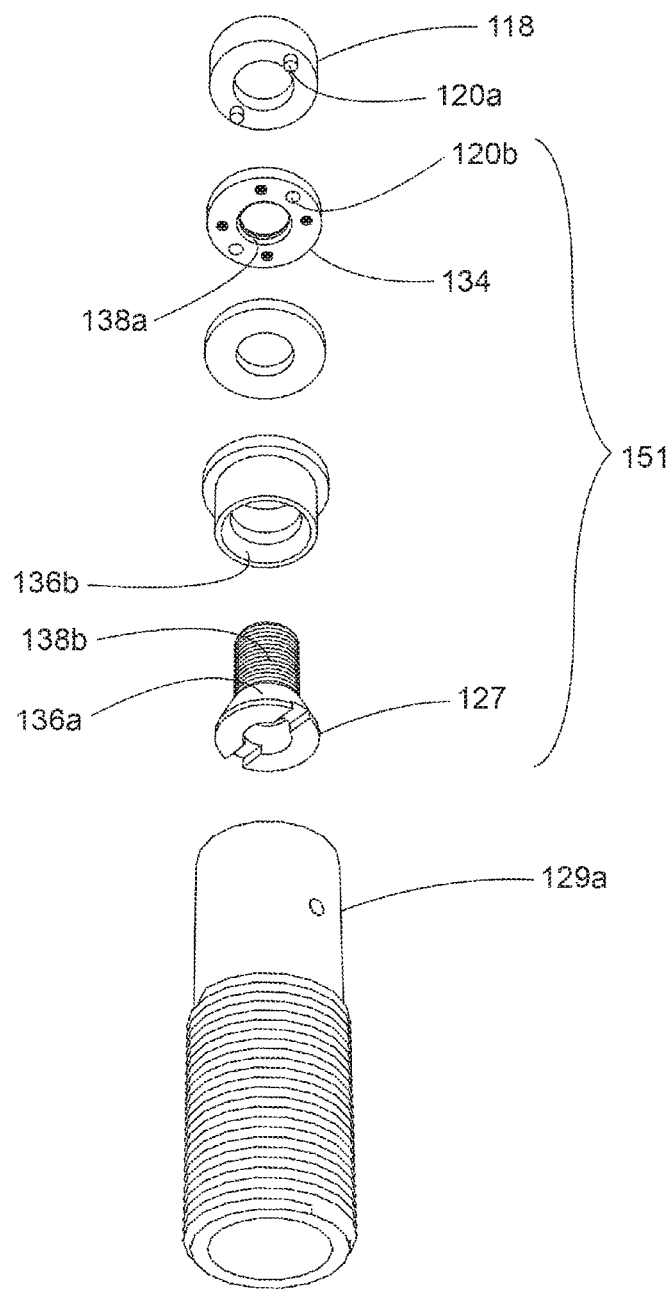
FIG. 23 is an exploded bottom perspective of the plug sub assembly shown in FIG. 22.

FIG. 23 is an exploded bottom perspective view of plug sub assembly 151 shown in FIG. 22. Externally threaded surface 138b engages with internally threaded section 138a. Pin 120a engages pin aperture 120b, and when engaged, pin 120a transmits the torque applied to cylinder 118 through pins 120a to locking nut 134 to secure together the different aspects of plug sub assembly 151. Plug sub-assembly 151 is positioned inside top conduit section 129a and tapered section 136a wedges against tapered cavity 136b, deforming rubber plug 126 such that its circumference increases and force is applied radially to the interior of upper conduit section 129a, securing plug sub-assembly 151 in place.

Figure 24:
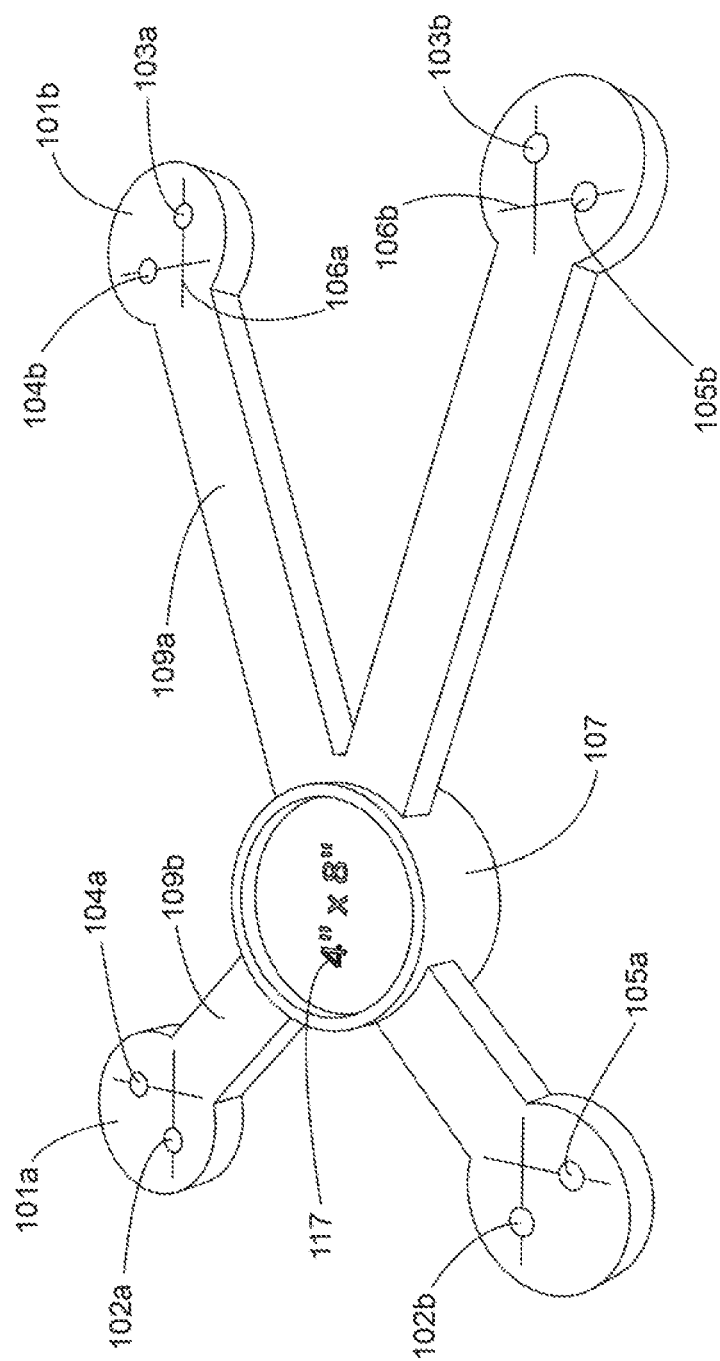
FIG. 24 is a top perspective view of a line marking template tool.

In the current example of a football field, the location where the assembly is being installed must be precisely located. The precisely located pylon, in turn, can be helpful for the grounds crew who paint the boundaries onto the field as they can use the location of the installed assembly as a reference point for applying paint, chalk, or a similar compound to the field to mark the boundaries. Thus, the inventive concept includes providing for a line marking template tool. FIG. 24 is a perspective tilted view looking down on the top of an exemplar line-marking template tool. The line marking template tool is made of a material that provides the durability desired to withstand frequent handling. In this example, the material used to make the tool is aluminum, and as the tool may frequently be coated by paint overspray in the course of its normal use, the aluminum has a smooth surface finish that will allow this paint, should it become built up, to be easily cleaned from the surface by use of abrasives and/or chemical solvents. Four arms, exemplified by arms 109a and 109b, extend radially from the tool's center section 107. At the end of each arm is a pod, such as pods 101a and 101b. Each pod has multiple channels 102a therethrough, through which a common duplex nail 110 is to be inserted. Opposite pairs of channels are typically spaced so that their centers are either 4" or 8" apart (4" and 8" are common widths for painted lines on athletic fields), but may be spaced closer or farther for different applications. To illustrate, channels 102a and 102b and 103a and 103b are spaced 4" apart on center. Channels 104a and 104b and 105a and 105b are spaced 8" apart on center. A set of perpendicularly intersecting positioning lines 106a and 106b are engraved, or otherwise permanently marked, on the surface of each pod and centered on the channels. The positioning lines serve as a reference to indicate the alignment of the lines to be painted. Label 117 indicates the spacing of the channels, 4" and 8" in this example, and, to wit, the line dimensions for which the tool may be used, and is engraved or otherwise permanently marked on the surface of center section 107.

Figure 25:
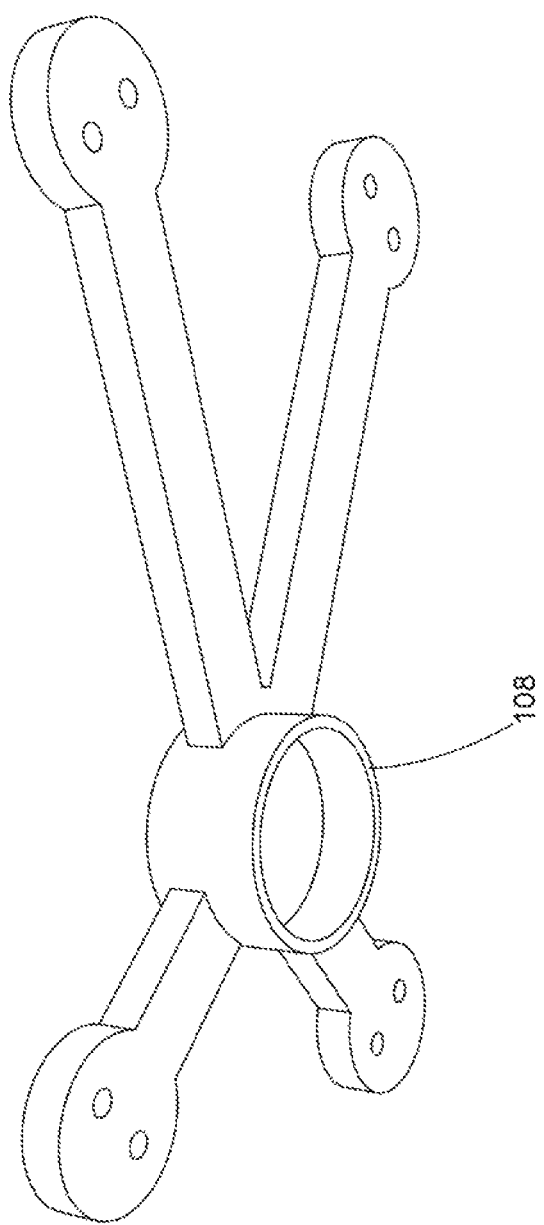
FIG. 25 is a bottom perspective view of a line marking template tool.

FIG. 25 is a perspective view looking up to the bottom of an exemplar line marking template tool. Flange 108 forms the bottom surface of the rim edge of the tool's center section and has an inside diameter that matches the outside diameter of cap 121, enabling the flange 108 to be placed over cap 121, thus correctly locating the line marking template tool at the pylon position.

Figure 26:
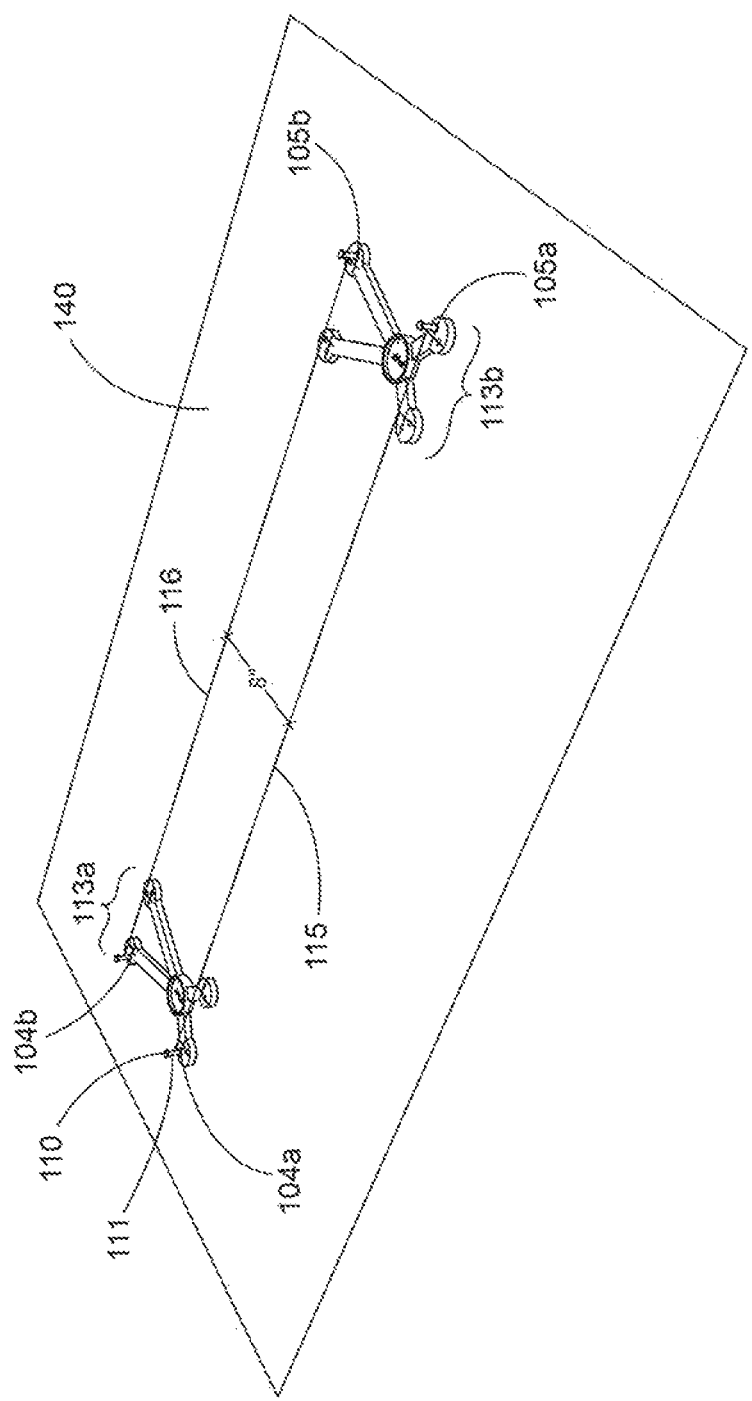
FIG. 26 is a perspective view of line marking template tools in use.

FIG. 26 is a perspective tilted view of an example scenario of marking an 8" wide line as a goal line using paint applied to the field surface. The ground surface finished grade 140 represents the field surface. One line marking template tool 113a would be placed at the pylon position at one end of the line and a second tool 113b placed at the position at the other end of the line with each tool's flange over the cap at their respective positions. The tools are oriented so that the eight inch dimensions of each opposite tool are parallel. A common duplex nail 110 is placed in each aperture 104a and aperture 104b of one tool 113a and in each aperture 105a and aperture 105b of the other tool 113b. The nails are pushed into the ground, securing the tool in its orientation. A string 115 is affixed to the top section 111 of the nail in aperture 104a of the first tool and stretched taut across the field to aperture 105a of the second tool, where it is secured. A second string 116 is similarly affixed to the nail in aperture 104b of the first tool and stretched taut across the field to aperture 105b of the second tool. The area between the strings will measure 8", and serve to indicate the area where paint should be applied to the field to create the marking. Upon completion of the marking, the strings and nails are removed and the tools are removed.

Figure 27:
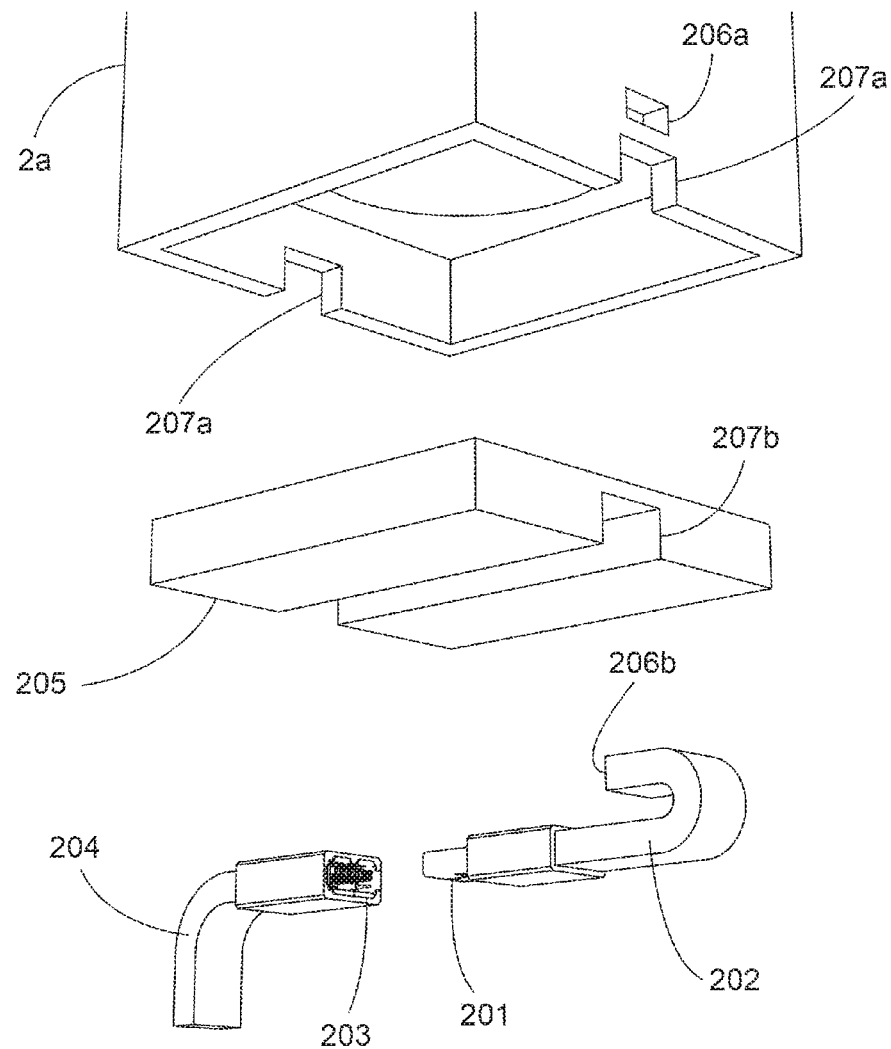
FIG. 27 is an exploded perspective view of a pylon configured with USB3 connectors.

FIG. 27 is an exploded perspective view of pylon 2a configured with USB3 connectors. In this embodiment, pylon-mounted camera assembly 10 does not comprise pylon connector 30 or base connector 20, but rather, the electrical connection between camera 40 (shown in FIG. 1) and transmitter 76 (shown in FIG. 9) is made through the connection of USB3 plug 201 and USB3 receptacle 203. Flexible cable 204 is connected at one end to transmitter 76 (shown in FIG. 9) and at pylon 2a, the terminal end of flexible cable 204 has USB3 receptacle 203. USB3 receptacle 203 engages USB3 plug 201, which terminates at one end of flexible cable 202. Cable pass-through aperture 206a allows end 206b of cable 202 to enter inside pylon 2a and connect to cameras 40 (shown in FIG. 1). Insert 205 fills the space in the bottom of pylon 2a otherwise filled by pylon connector 30. Insert 205 is placed such that its bottom is flush with the bottom of pylon 2a and any remaining space above insert 205 inside the pylon allows room to make electrical connections to the wiring throughout the pylon. Notch 207b of insert 205 matches notch 207a of pylon 2a.

Figure 28:
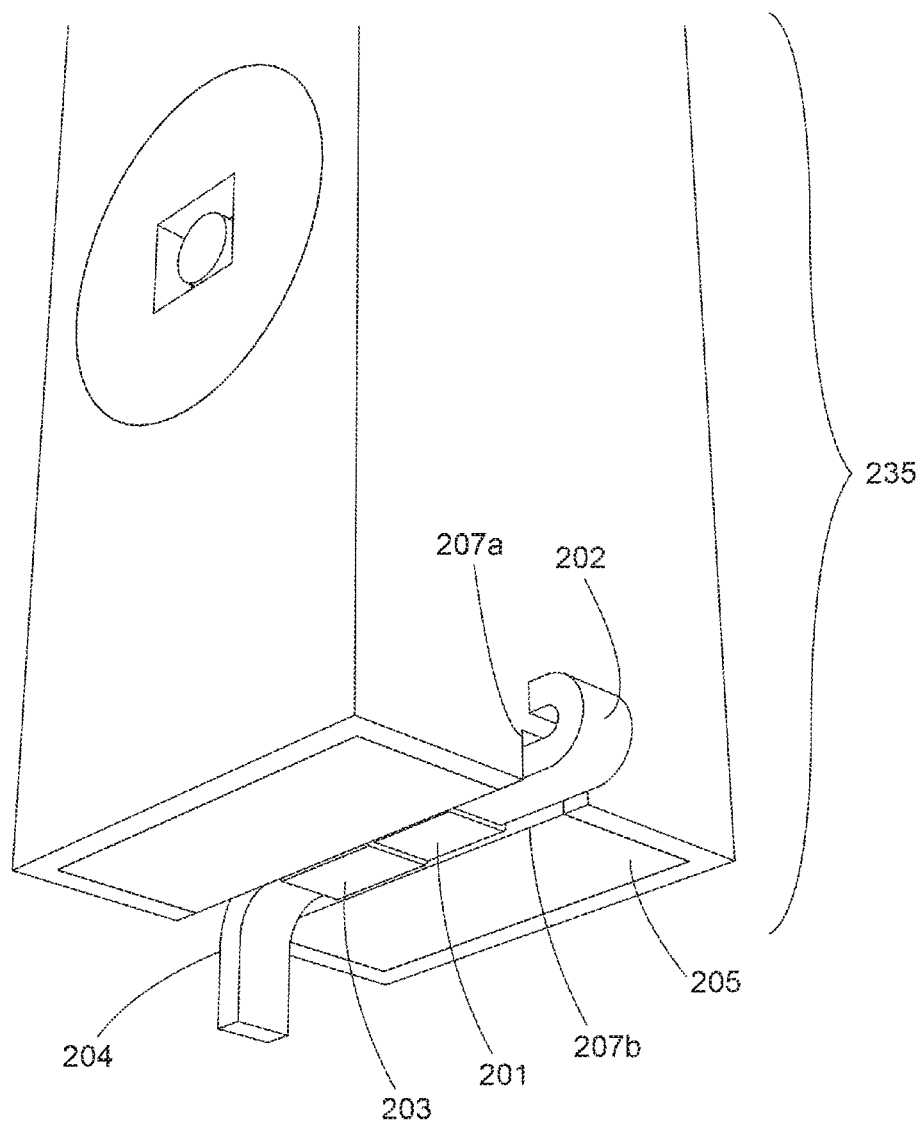
FIG. 28 is a bottom perspective view of an assembled pylon configured with USB3 connectors.

FIG. 28 illustrates the bottom portion of pylon-mounted camera assembly 235 configured with a USB3 connection. Notches 207a and 207b create a space into which USB3 plug 201, USB3 receptacle 203, and cables 202 and 204 fit so that protrusion outside of pylon 2a is minimized, and pylon 2a is allowed to stand fully upright. Cables 202 and 204 are flexible to facilitate the mating of USB3 plug 201 and USB3 receptacle 203.

Figure 29:
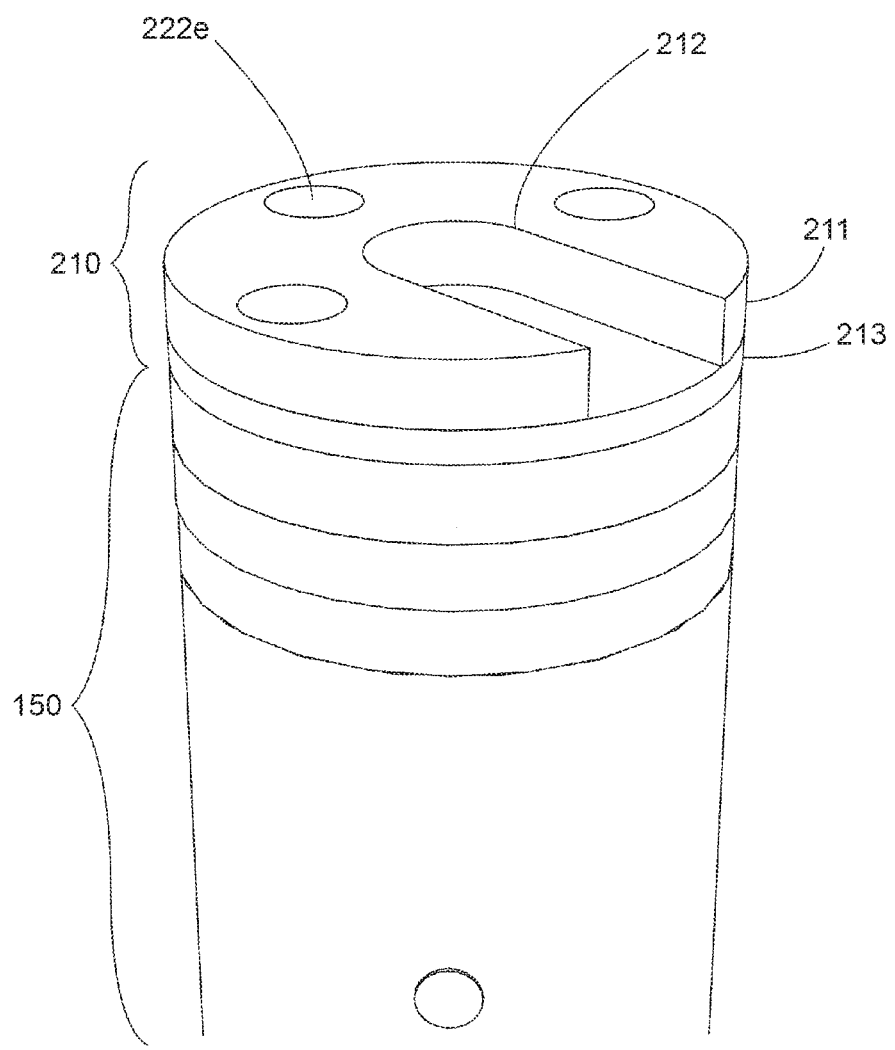
FIG. 29 is a perspective view of an installed self-sealing cap.

FIG. 29 is a perspective view of self-sealing cap 210 installed on base mounting structure 150 (see FIG. 18). Self-sealing cap 210 comprises cap 211 with notch 212 and gasket 213. To use self-sealing cap 210, cap 121 is removed and all electrical wiring is aligned with notch 212. Self-sealing cap 211 is then secured to the structure with flathead screws through apertures 222e.

Figure 30:
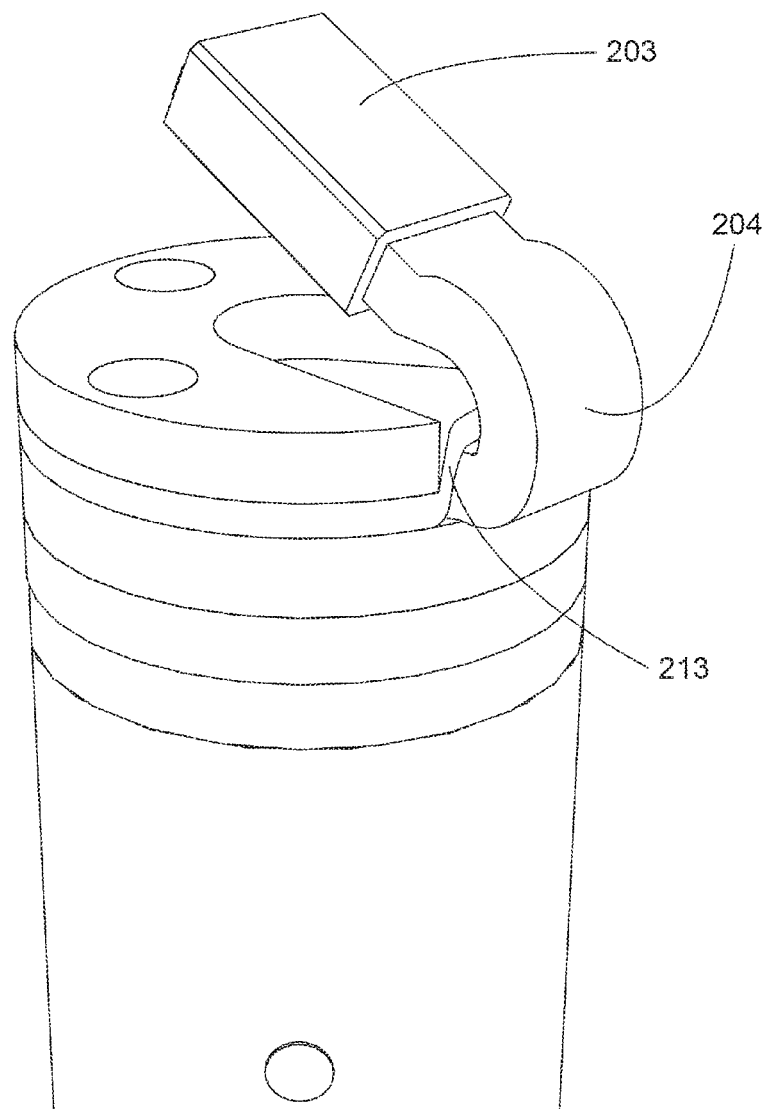
FIG. 30 is a perspective view of an installed self-sealing cap with USB3 connector and cable in place.

FIG. 30 is a perspective view of flexible cable 204 with USB3 receptacle 203 on its terminal end. Gasket 213 is flexible and conforms around cable 204, creating a seal that prevents water and other debris from entering the conduit.

FIG. 31 is an exploded perspective view of corner-oriented pylon-mounted camera assembly 310. Apertures 303a and 303b are complete through-bores located on the corners of pylon 302. Cameras 340 are inserted into apertures 303a and 303b. Cameras 340 are fitted with wide-angle lenses with approximately 122 degrees of horizontal vision, but the field of view may be wider or narrower. As used herein, "approximately 122 degrees" should be interpreted to mean any field of view within 15 degrees of 122 degrees, i.e., from 107-137 degrees. Sled 360 is inserted behind camera 340, and comprises camera housing 344, fan 304, and fan cover 308. Similarly, camera 345 (not shown) may also be inserted into aperture 420. Camera 345 (not shown) is a narrow-angle lens with approximately 45 degrees of vision, but the field of view may be wider or narrower. The camera assembly surrounding camera 345 is similar to that of previously described embodiments of camera 340.

In an example embodiment, the optical axes of each camera 340 located within apertures 303a and 303b are orthogonal, but it should be appreciated that they may be oriented at an angle greater than or less than 90 degrees as well. There may also be also only a single corner-oriented camera, or more than two.

Figure 31A:
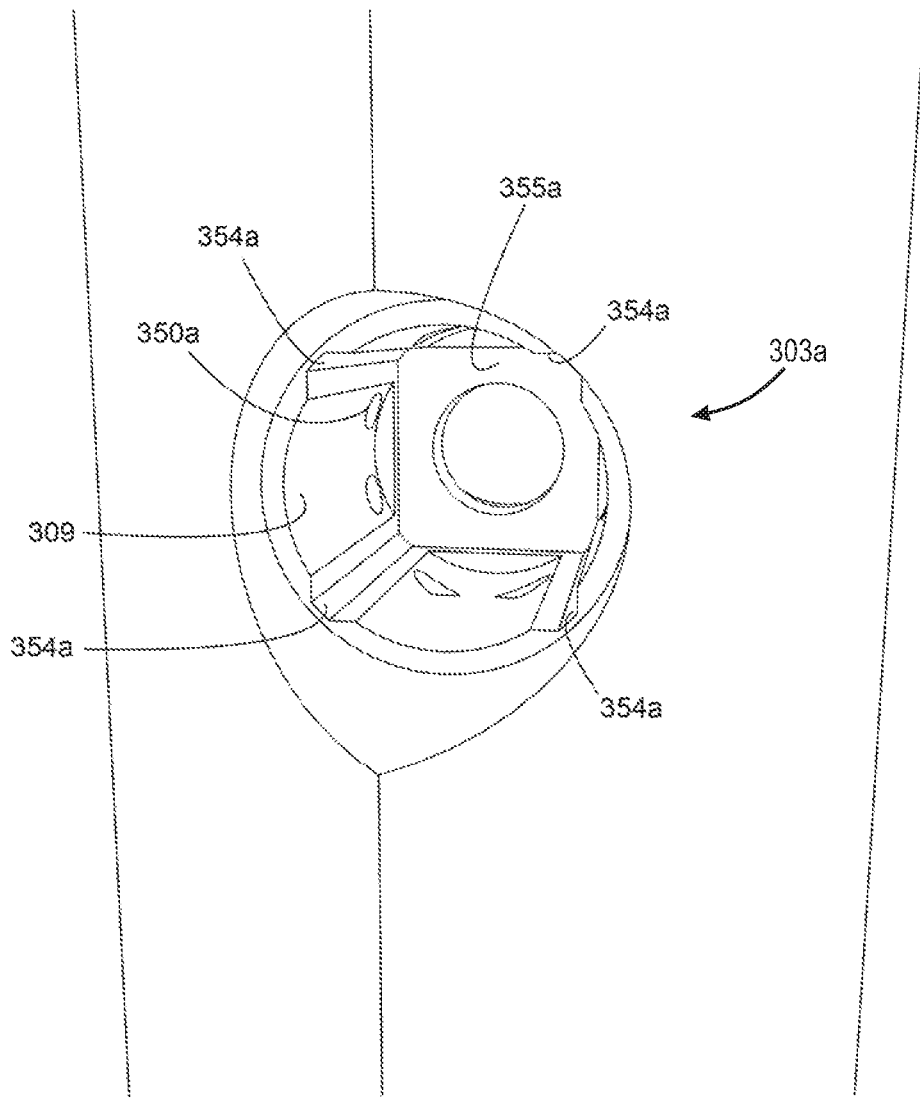
FIG. 31a is a perspective view of a cavity into which a camera assembly as shown in FIG. 31 is placed.

FIG. 31a is a perspective view of aperture 303a. Camera 340 is inserted into aperture 303a such that face 355b of camera 340 contacts camera face seat 355a. Notches 354a accept the edges of camera 340 and prevent camera 340 from rotating within aperture 303a. Camera housing 344 is then inserted, contacting cavity 303a and held in place by both a friction fit and, if desired, the addition of an adhesive, providing additional anti-rotation measures and securely holding face 355b of camera 340 against camera face seat 355a. Fan 304 resides within housing 344 and is secured thereto. Fan cover 308 rests against flange seat 309. Fan cover 308 is made of the same material as pylon 302, and comprises a through bore. Ventilation channels 350a extend from a face of pylon 302 and provide a path by which air can be moved across camera 340 and through aperture 303a by fan 304 to cool camera 340. The through bore in fan cover 308 provides a continuation of the path of airflow. The lens of camera 340 is covered by removable camera lens tube 353 with a front element made of glass or of a type of optically clear, impact-resistant material.

FIG. 31b is a reverse exploded perspective view of corner-oriented pylon-mounted camera assembly 310 shown in FIG. 1.

Figure 32:
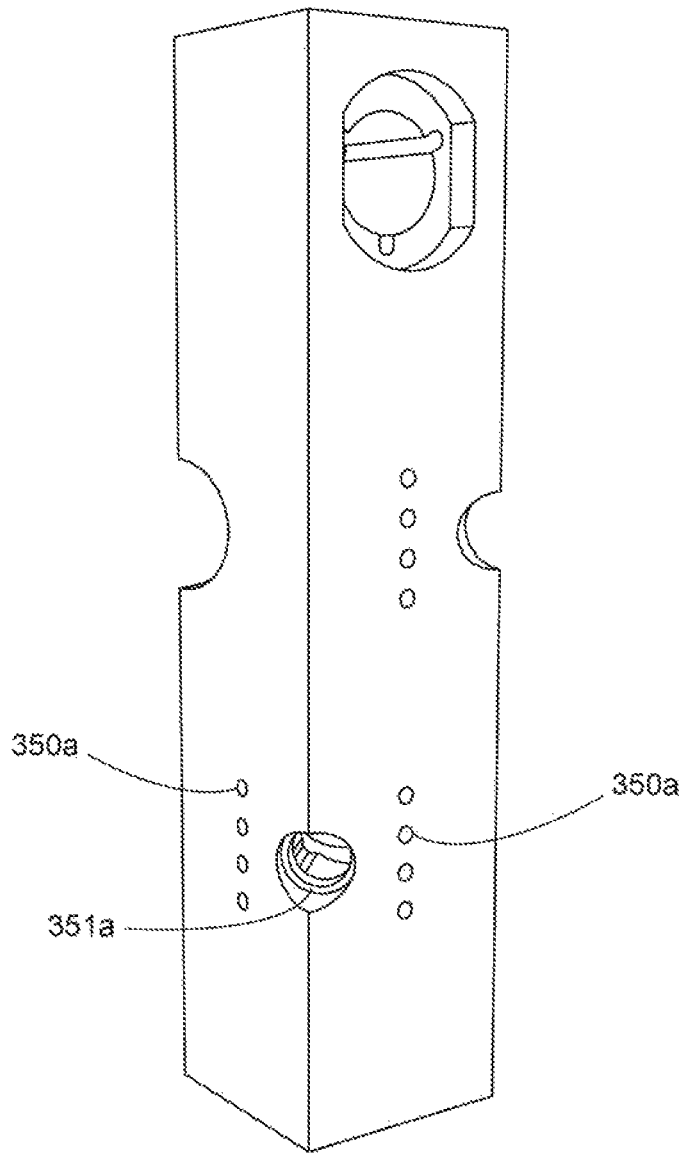
FIG. 32 is a perspective view of one embodiment of a pylon-mounted camera assembly.

FIG. 32 is a perspective view of corner-oriented pylon-mounted camera assembly 310. Rear face 351b (shown in FIG. 31b) of camera lens tube 353 is seated upon flange 351a when installed. Ventilation channels 350a may provide additional ventilation to the camera assembly.

Figure 33:
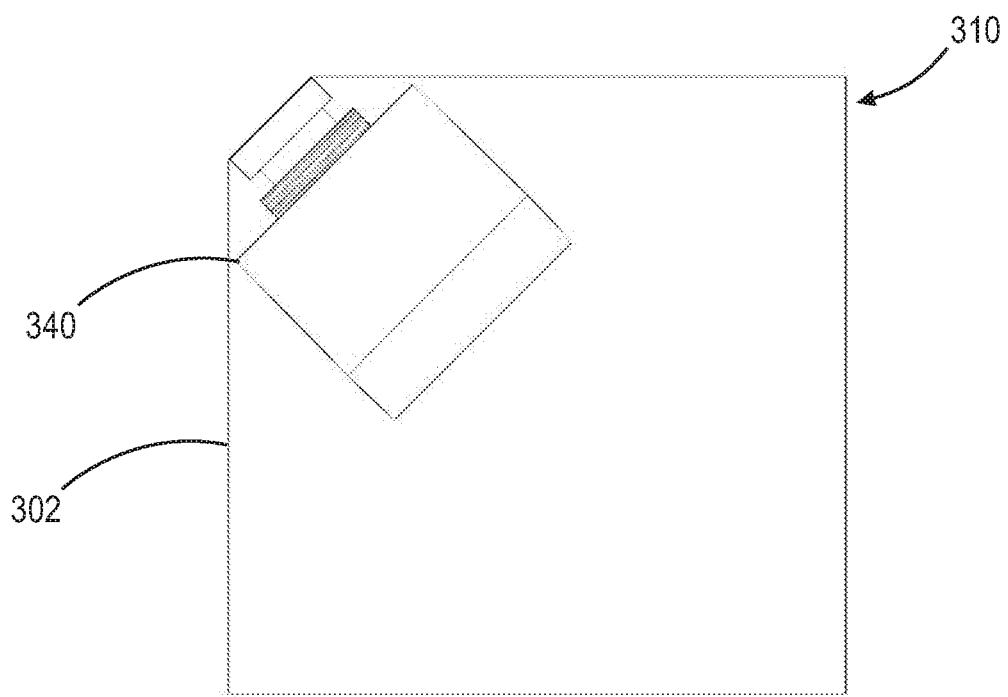
FIG. 33 is a top sectional view of one embodiment of a pylon-mounted camera assembly.
Figure 34:
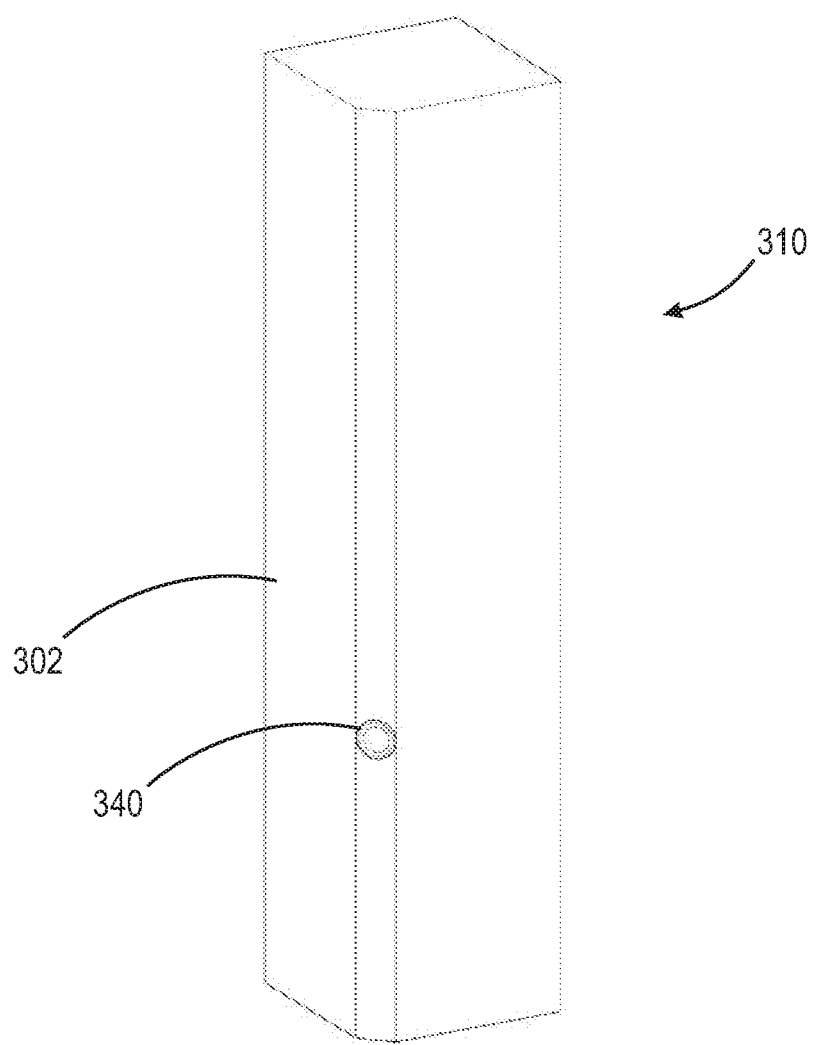
FIG. 34 is a front perspective view of one embodiment of a pylon-mounted camera assembly.

FIG. 33 is a top sectional view of pylon camera assembly 310. In this example embodiment, the corners of pylon 302 are beveled or chamfered, i.e., they form a flat surface between two adjacent faces of pylon 302. This beveled face, formed on the corner of pylon 302, is slightly larger in width than the diameter of the lens of camera 340. This would allow a substantial portion of pylon 302 to remain flush with sideline 402 and goal line 400 (shown in FIG. 36). It should be appreciated that the first and second faces of the pylon can be connected by a third and fourth face forming a substantially cuboid pylon structure. It should also be appreciated that a single additional face, i.e., a third face could connect the first and second faces forming substantially a prism pylon structure. It should also be appreciated that the third face does not have to be planar, e.g., it could be rounded or any other shape that can connect the first and second faces to complete the pylon structure. As shown in FIG. 31, pylon 302 also includes a third aperture 420 arranged to receive a third camera which faces the goal line 400 discussed infra. The third camera is substantially similar to camera 340 described supra. FIG. 34 is a front perspective view of one embodiment of a pylon-mounted camera assembly 310.

Figure 35:
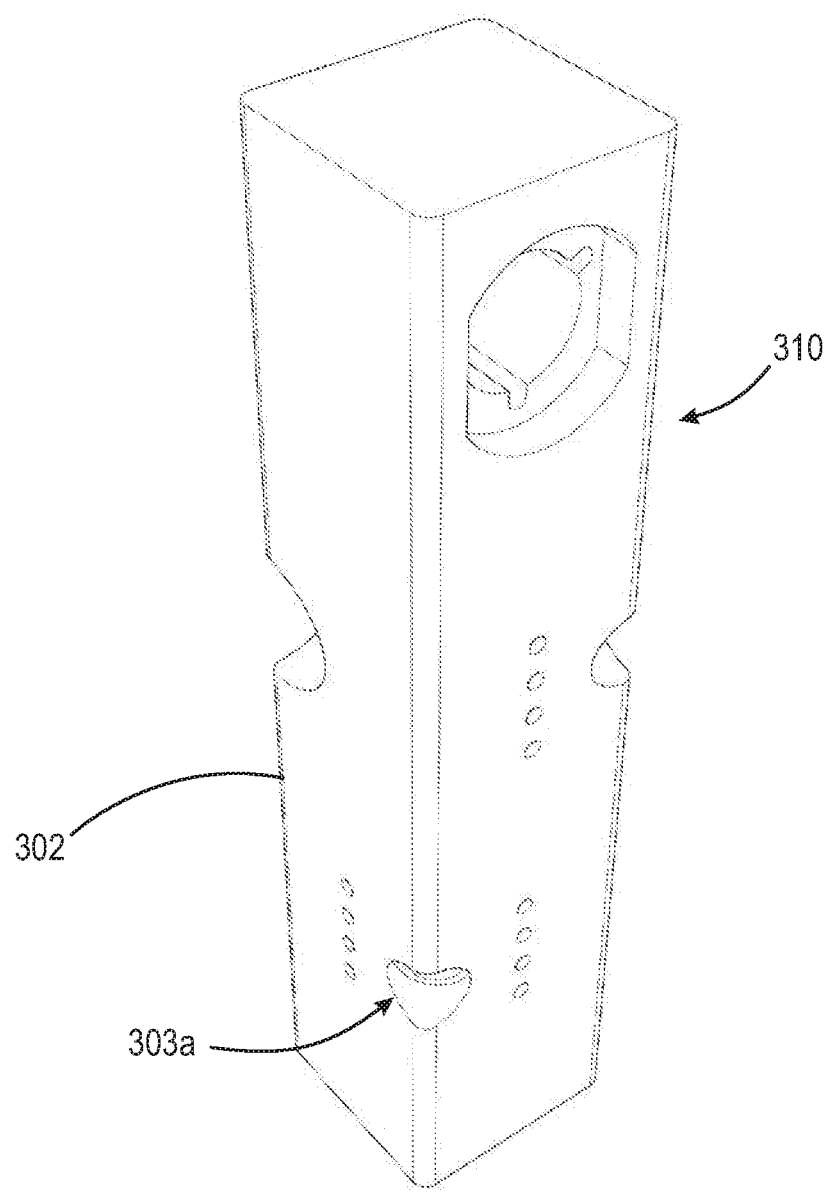
FIG. 35 is a front perspective view of one embodiment of a pylon-mounted camera assembly; and, FIG. 36 is a top view of a corner-oriented pylon camera in use on a football field.

FIG. 35 is a front perspective view of pylon-mounted camera assembly 310. In this example embodiment, pylon 302 comprises rounded corners between adjacent pylon faces.

Figure 36:
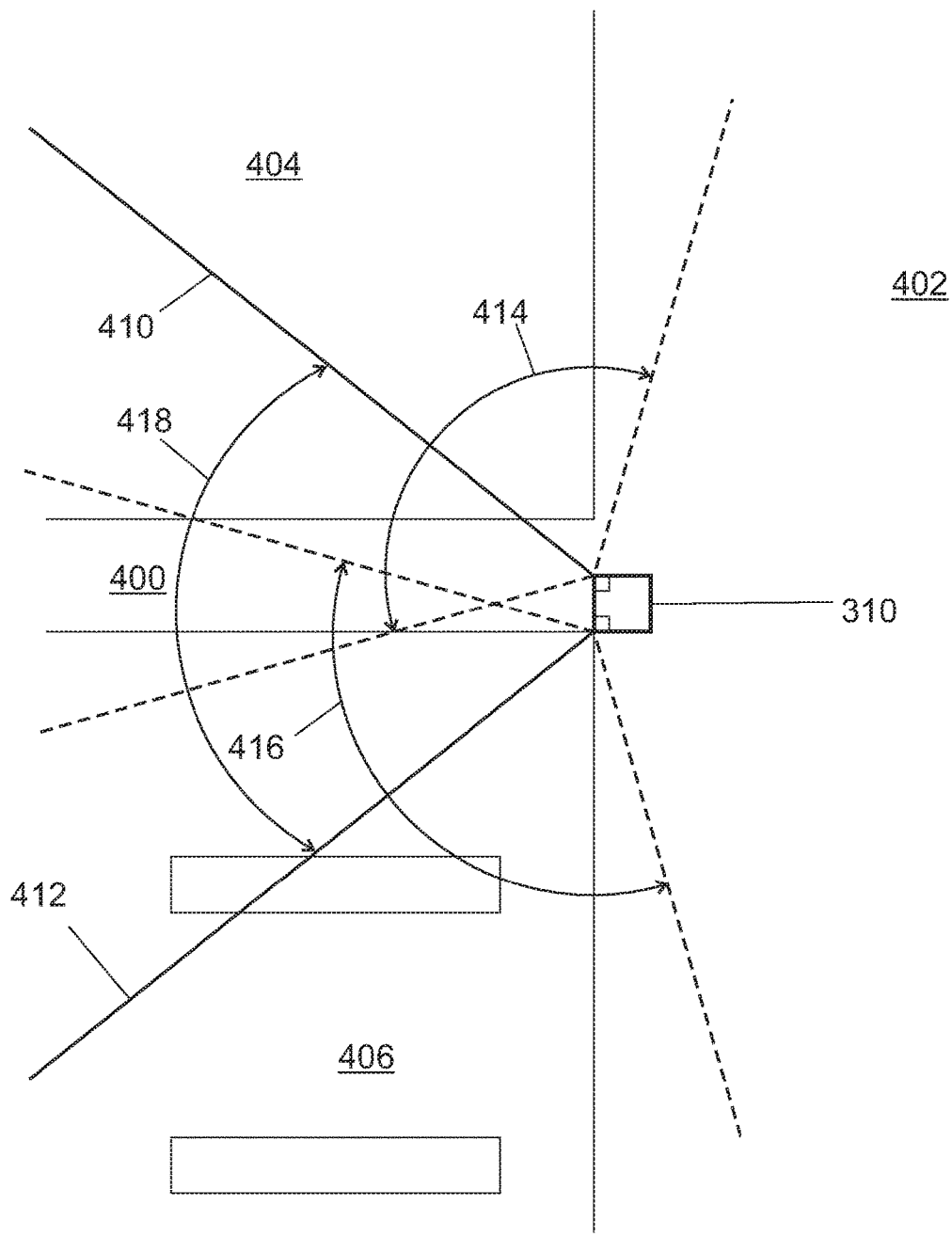

FIG. 36 is a top view of pylon-mounted camera assembly 310 in use. Pylon 302 is positioned such that corner of pylon 302 that included aperture 303b is positioned at the intersection of goal line 400 and sideline 402. Camera 340 positioned in aperture 303b (shown in FIG. 31) has field of view 416 that enables it to visualize sideline 402, field of play 406, goal line 400, and parts of endzone 404. Optical axis 412 of camera 340 positioned in aperture 303b is arranged to bisect the area created between goal line 400 and sideline 402. In an example embodiment, field of view 416 is 122 degrees horizontally. Camera 340 positioned in aperture 303a (shown in FIG. 31) has optical axis 410 that is substantially orthogonal to optical axis 412 such that angle 418 is 90 degrees. Field of view 414, in an example embodiment, is also 122 degrees horizontally, and can view sideline 402, end zone 404, goal line 400, and field of play 406. For the sake of clarity, camera 345 in aperture 420 has been omitted from FIG. 36. However, it should be noted that the optical axis of camera 345 runs substantially parallel to goal line 400, and the field of view of camera 345 is narrower than that of cameras 340 to provide clarity for images directly down goal line 400. It should also be appreciated that, although not shown, it is possible to mount a microphone on the corners of pylon 302 which include apertures 303a and/or 303b such that the microphone can register sound emanating from action taking place on the field. It should further be appreciated that these microphones can also be mounted on the planar faces of pylon 302. In one example embodiment aperture 303a is positioned lower on pylon 2, i.e., closer to the ground, than aperture 303b. However, it should be appreciated that aperture 303a can also be positioned higher on pylon 2, i.e., farther away from the ground, than aperture 303b. The lower mounted camera that is mounted within the lower aperture can see more of the field closer to the pylon, and therefore, should face the field of play. Furthermore, it should be appreciated that two or more pylons can be used on a playing field at a time and it may be desirable to alter the positions of the apertures to match the side of the field the pylon is positioned on.

The foregoing description, for purposes of explanation, uses specific and defined nomenclature to provide a thorough understanding of the invention. However, it will be apparent to one skilled in the art that the specific details are not required in order to practice the invention. Thus, the foregoing description of the specific embodiment is presented for purposes of illustration and description and is not intended to be exhaustive or to limit the invention to the precise form disclosed. Those skilled in the art will recognize that many changes may be made to the features, embodiments, and methods of making the embodiments of the invention described herein without departing from the spirit and scope of the invention. Furthermore, the present invention is not limited to the described methods, embodiments, features or combinations of features but include all the variations, methods, modifications, and combinations of features within the scope of the appended claims. The invention is limited only by the claims.

LIST OF REFERENCE NUMERALS

1a Section View
2 Pylon
2a Pylon
3a Cavity
3b Cavity
3d Cavity
3e Cavity
3f Cavity
4 Fan
5a Aperture
6 Fan flange
6a Fan flange
7 T-nut
8 Fan flange cover
8a Fan flange cover
9 Circular flange seat
10 Pylon-mounted camera assembly
11a Notch
11b Notch
12a T-bolt
12b Aperture
12c Aperture
12d Sleeve
13b Notch
14 Camera-flange cover
14a Camera-flange cover
15 Camera mounting sled
16 Recess 16a Weight
17a Wire conduit
17b Wire conduit
18 Pogo pin
20 Connector base
21n Magnet North pole
21s Magnet South pole
22 Magnet
22n Magnet North pole
22s Magnet South pole
23n Space for Magnet North Pole
23s Space for Magnet South Pole
24 Screw
25n Space for Magnet North Pole
25s Space for Magnet South Pole
26 Pad
28 Magnet
30 Pylon connector
34 Aperture
36 Aperture
40 Camera
42 Camera-flange
42a Camera-flange
43 Aperture
44 Housing
45 Camera lens
50 Camera sub-assembly
60 Fan sub-assembly
61 Foam cover
65 Cavity
66 Cavity
70 Diagrammatic circuit
72 Power supply/Battery
74 Power cable
76 Transmitter
78 Fiber-optic cable
80 Cable
82 Receiver
84 Power supply/Battery
86 Cable
88 Cable
90 Cable
92 Controller
94 Video recorder
98 Re-clocking distribution amplifier
101a Pod
101b Pod
102a Aperture
102b Aperture
103a Aperture
103b Aperture
104a Aperture
104b Aperture
105a Aperture
105b Aperture
106a Positioning lines
106b Positioning lines
107 Center section
108 Flange
109a Arm
109b Arm
110 Nail
111 Nail top
113a Tool
113b Tool
115 String
116 String
117 Label
118 Cylinder
119 Cavity
120a Pin
120b Aperture
121 Cap
122a Aperture
122b Aperture
122c Aperture
122d Aperture
123 Connector base
124 Pass-through cap
125 Washer
126 Plug
127 Plug
128a Cavity
128b Pin
129a Upper conduit section
129b Coupler
129c Lower conduit section
130a Aperture
130b Aperture
130c Aperture
130d Aperture
131a Fin
132 Flange
133 Conduit
134 Nut
135 Pylon-mounted camera assembly
136a Tapered section
136b Cavity
137a Flange
137b Conduit top surface
138a Threaded portion
138b Threaded portion
140 Field surface
150 Base mounting system
151 Plug sub-assembly
201 USB3 plug
202 Cable
203 USB3 receptacle
204 Cable
205 Insert
206a Aperture
206b Cable end
207a Notch
207b Notch
210 Self-sealing cap
211 Cap
212 Notch
213 Gasket
222e Aperture
235 Pylon-mounted camera assembly
302 Pylon
303a Aperture
303b Aperture
304 Fan
308 Fan cover
309 Seat
310 Pylon-mounted camera assembly
340 Camera
344 Housing
345 Camera
350a Channel
351a Flange
351b Camera rear
353 Tube 354a Notch
355a Flange
355b Face
360 Camera mounting sled
400 Goal line
402 Sideline
404 Endzone
406 Field of play
410 Optical axis
412 Optical axis
414 Field of view
416 Field of view
420 Cavity

The invention claimed is:

1. A pylon/camera assembly comprising:
a body having a first face adjacent to a second face, and a third face adjacent to the first face and the second face, such that the first face and the second face form a first corner and the second and third face form a second corner;
a first aperture arranged at and centered about the first corner;
a second aperture arranged at and centered about the second corner;
a first camera positioned within the first aperture, the first camera facing outwardly from the body;
a second camera positioned within the second aperture, the second camera facing outwardly from the body; and,
a third camera operatively arranged to pass through the first face or the second face.

2. The pylon/camera assembly of claim 1, wherein the first camera is arranged about a first optical axis and the second camera is arranged about a second optical axis, where the first optical axis and second optical axis are substantially orthogonal to one another.

3. The pylon/camera assembly of claim 1, wherein the first corner and second corner are chamfered or rounded.

4. The pylon/camera assembly of claim 1, wherein the first camera and second camera further comprise a first wide-angle lens and a second wide-angle lens, respectively.

5. The pylon/camera assembly of claim 4, wherein the first wide-angle lens and the second wide-angle lens have a first field of view and a second field of view, respectively, and the first field of view and the second field of view are approximately 122 degrees.

6. The pylon/camera assembly of claim 1, wherein the third camera comprises a telephoto lens.

7. The pylon/camera assembly of claim 1, wherein the first face or the second face further comprise a plurality of apertures.

8. The pylon/camera assembly of claim 1, wherein the first corner comprises a first through-bore, where the first through-bore is substantially defined by the first aperture and the second corner comprises a second through-bore, where the second through-bore is substantially defined by the second aperture.

* * * * *